(12) United States Patent
Walsh et al.

(10) Patent No.: US 12,147,823 B1
(45) Date of Patent: Nov. 19, 2024

(54) APPARATUS AND METHOD FOR PROVIDING A SAFETY-CRITICAL OPERATING ENVIRONMENT (SCOE)

(71) Applicant: Parry Labs, LLC, Alexandria, VA (US)

(72) Inventors: David Walsh, Alexandria, VA (US); Charles Adams, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/395,149

(22) Filed: Dec. 22, 2023

(51) Int. Cl.
*G06F 9/455* (2018.01)
*G06F 16/16* (2019.01)
*G06F 21/44* (2013.01)

(52) U.S. Cl.
CPC ............ *G06F 9/455* (2013.01); *G06F 16/164* (2019.01); *G06F 21/44* (2013.01)

(58) Field of Classification Search
CPC ......... G06F 9/455; G06F 16/164; G06F 21/44
See application file for complete search history.

(56) References Cited

U.S. PATENT DOCUMENTS

| | | | |
|---|---|---|---|
| 9,203,855 | B1 | 12/2015 | Mooring et al. |
| 10,699,003 | B2 | 6/2020 | Zamir et al. |
| 11,475,140 | B1 | 10/2022 | Buonora |
| 11,789,764 | B2 | 10/2023 | Vidyadhara et al. |
| 2022/0121470 | A1* | 4/2022 | Saxena .................. H04L 63/20 |
| 2022/0171648 | A1* | 6/2022 | Rodriguez ............ G06F 9/5072 |
| 2022/0197773 | A1* | 6/2022 | Butler ...................... G06F 9/505 |
| 2023/0297440 | A1* | 9/2023 | Cowperthwaite ..... G06F 9/5016 718/104 |

OTHER PUBLICATIONS

Santiago Lozano et al; A Comprehensive Survey on the Use of Hypervisors in Safety-Critical Systems; Received Mar. 9, 2023, accepted Mar. 29, 2023, date of publication Apr. 5, 2023, date of current version Apr. 14, 2023. Digital Object Identifier 10.1109/ACCESS.2023.3264825.
Shuang Zhang; Virtualization Airborne Trusted General Computing Technology; Appl. Sci. 2023, 13(3) Published: Jan. 19, 2023.

* cited by examiner

*Primary Examiner* — Kenneth Tang
(74) *Attorney, Agent, or Firm* — Caldwell Intellectual Property Law

(57) ABSTRACT

An apparatus for providing a safety-critical operating environment, comprising a host circuit having a processor and a memory containing instructions configuring the processor to operate a first partition within a virtual environment, by instantiating a hypervisor, generating a virtualization layer supervised by the hypervisor, and operating the first partition in the virtual environment using the virtualization layer, receive a configuration request containing a configuration request from the first partition, create a second partition within the virtual environment based on the configuration request by allocating processor time and a memory space for the second partition using the hypervisor based on the a partition policy, integrate a software module into the virtual environment by instantiating, within the second partition, a software image into a container having a non-preemptable container runtime, and verify a compliance of the integrated software module at the first partition.

20 Claims, 7 Drawing Sheets

APPARATUS AND METHOD FOR PROVIDING A SAFETY-CRITICAL OPERATING ENVIRONMENT (SCOE)

FIELD OF THE INVENTION

The present invention generally relates to the field of safety-critical operating system. In particular, the present invention is directed to an apparatus and method for providing a safety-critical operating environment (SCOE).

BACKGROUND

Conventional computing environments, especially those involved in safety-critical applications such as avionics demand not only robust computational capabilities but also stringent adherence to safety standards. These complex, software intensive systems are required to be highly reliable, secure, and able to run various operational modules across different platforms to prevent system-wide failures due to localized issues. There is a need for an operating system capable of implementing multiple sub-systems and software that can effectively bridge the non-uniformity between airframe, propulsion system, hydraulic system, power system, air vehicle system, mission system, among other sub-systems.

SUMMARY OF THE DISCLOSURE

In an aspect, an apparatus for providing a safety-critical operating environment is described. The apparatus includes a host circuit having at least a processor and a memory communicatively connected to the at least a processor, wherein the memory contains instructions configuring the at least a processor to operate a first partition within a virtual environment, wherein operating the first partition further includes instantiating a hypervisor, generating a virtualization layer supervised by the hypervisor, and operating the first partition in the virtual environment using the virtualization layer. The at least a processor is also configure to receive a configuration request from the first partition, wherein the configuration request includes a software image including a pre-defined operational rule and at least one partition policy, create a second partition within the virtual environment as a function of the configuration request, wherein creating the second partition includes allocating a dedicated execution time slice and a private static memory space for the second partition using the hypervisor based on the at least one partition policy. The at least a processor is further configured to integrate a software module into the virtual environment using the pre-defined operational rule by instantiating, within the second partition, the software image into at least one container, wherein the at least one container includes a non-preemptable container runtime, and verify a compliance of the integrated software module with a plurality of pre-determined safety standards sourced from a trusted repository by monitoring an adherence of the software module to the pre-defined operational rule within non-preemptable container runtime at the first partition.

In another aspect, a method for providing a safety-critical operating environment is illustrated. The method includes operating, by at least a processor at a host circuit having a memory communicatively connected to the at least a processor, a first partition within a virtual environment, wherein operating the first partition further includes instantiating a hypervisor, generating a virtualization layer supervised by the hypervisor, and operating the first partition in the virtual environment using the virtualization layer. The method also includes receiving, by the at least a processor, a configuration request from the first partition, wherein the configuration request includes a software image including a pre-defined operational rule and at least one partition policy, creating, by the at least a processor, a second partition within the virtual environment as a function of the configuration request, wherein creating the second partition includes allocating a dedicated execution time slice and a private static memory space for the second portion using the hypervisor based on the at least one partition policy. The method further includes integrating, by the at least a processor, a software module into the virtual environment using the pre-defined operational rule by instantiating, within the second partition, the software image into at least one container, wherein the at least one container includes a non-preemptable container runtime, and verifying, by the at least a processor, a compliance of the integrated software module with a plurality of pre-determined safety standards sourced from a trusted repository by monitoring an adherence of the software module to the pre-defined operational rule within non-preemptable container runtime at the first partition.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for providing a safety-critical operating environment (SCOE). In an embodiment, a multi-partition architecture is implemented to dynamically isolate critical applications and services from non-critical ones, thus maintaining system integrity and reliability. Aspects of the present disclosure can be used to ensure compliance of software applications with stringent safety and security standards, such as those found in various avionics. Aspects of the present disclosure can also be used to optimize resource allocation, such as memory and processing power. Aspects of the present disclosure allow for improved scalability and adaptability in response to changing operational requirements. Exemplary embodiments illustrating aspects of the present disclosure are described below in the context of several specific examples.

Figure 1:
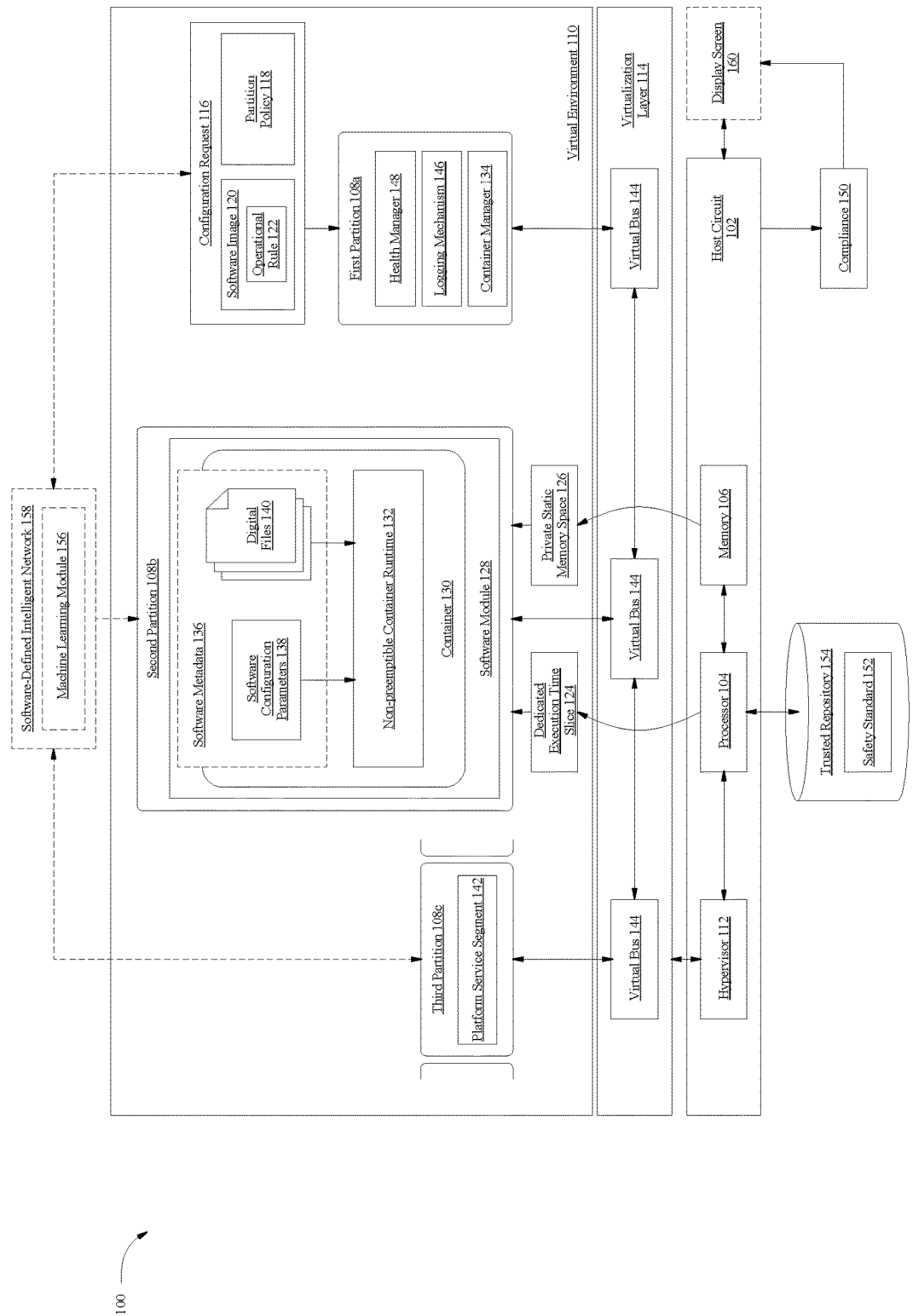
FIG. 1 is a block diagram illustrating an apparatus for providing an SCOE.

Referring now to FIG. 1, an exemplary embodiment of an apparatus 100 for providing a safety-critical operating environment is illustrated. In one or more embodiments, apparatus 100 is configured to implement one or more aspects of a safety-critical operating environment. As used in this disclosure, a "safety-critical operating environment" is a system, application, or context in which the proper and error-free operation is vital to ensure the safety of both user and property. Failures, malfunctions, or unintended behaviors in such environment may lead to severe harm or consequences, especially in aviation systems, such as flight control system, air traffic control system, an any other avionic components within an aircraft or broader aviation infrastructure shoes correct operation is imperative to ensure the safety of the flight, passengers, crew, and others on the ground. In a non-limiting example, air vehicle system operates may contain a myriad of subsystems categorized as "avionics" (i.e., electronics in the air composed of hardware, software, and/or firmware, or a combination thereof) that are a mix of Government Furnish Equipment (GFE) and Contractor Furnished Equipment (CFE), wherein each avionics subsystem within the mission system may include one or more application software (each containing millions of lines of software source code) that perform functions some of which have been determined to be safety critical by the required and/or independent Army authority.

With continued reference to FIG. 1, in or more embodiments, apparatus 100 may implement one or more aspects of Future Airborne Computing Environment (FACE™). As used in this disclosure, a "Future Airborne Computing Environment" is a technical standard and business strategy for promoting acquisition of open systems software architecture in aviation industry, specifically for military avionics system. In some cases, apparatus 100 may employ FACE approach, wherein hosting circuit 102 may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, apparatus 100 may include one or more extensions to FACE that satisfy safety assumptions in hardware outside FACE Boundary. In a non-limiting example, FACE may include a plurality of API groups (i.e., segments), wherein one or more API groups may be dependent for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, apparatus 100 includes a host circuit 102. Host circuit 102 includes at least a processor 104 communicatively connected to a memory 106. As used in this disclosure, a "host circuit" is an integrated circuit or a collection of interconnected circuits designed to manage, control, and/or interface with one or more functionalities in a system. In a non-limiting example, host circuit 102 may be configured as a primary platform or base that provides essential infrastructure, resources, and interfaces to facilitate the operation of other connected or integrated components. Hosting circuit 102 may include any computing device as described in this disclosure, including without limitation a microcontroller, microprocessor, digital signal processor (DSP) and/or system on a chip (SoC) that provide one or more services, resources, or data to other computing devices. Host circuit 102 may include, be included in, and/or communicate with a mobile device such as a mobile telephone or smartphone. Host circuit 102 may include a single computing device operating independently, or may include two or more computing device operating in concert, in parallel, sequentially or the like; two or more computing devices may be included together in a single computing device or in two or more computing devices. In some cases, Host circuit 102 may include but is not limited to, for example, a computing device or cluster of computing devices in a first location and a second computing device or cluster of computing devices in a second location. In other cases, host circuit 102 may include a main unit or a primary circuit in a network that controls communications and/or provide a central point of interface.

With continued reference to FIG. 1, in some cases, at least a processor 104 may include a multi-core processor, wherein the "multi-core processor" is an integrated circuit that contains at least two cores on a single chip. In some cases, at least two processor cores may work simultaneously, allowing multiple tasks to be executed in parallel. A "core," for the purpose of this disclosure, is an individual processor unit within a larger processing unit (e.g., central processing unit [CPU] or graphics processing unit [GPU]). In some cases, "core" may be used interchangeably with the terminology "processor" in this disclosure. Each core of at least two cores may be capable of reading and/or executing one or more program instructions, performing arithmetic operations, managing data, and/or communicating with other components within apparatus 100. In a non-limiting example, at least a processor 104 may include a dual-core processor, quad-core processor, hexa-core processor, octa-core processor, many-core processor, or any processor that may perform simultaneous multi-threading (SMT) and/or dynamic core allocation. In some cases, at least a processor 104 may include one or more integrated graphics cores. In some cases, at least a processor 104 may include a cache architecture, wherein each core may include a private L1 (and in some cases, L2) cache, and all cores may share a larger L3 cache. In some cases, at least a processor 104 may integrate at least two cores that are not identical, for example, and without limitation, a high-performance "heavy" core may be combined with an energy-efficient "lite" core. Host circuit 102 may choose the best core for a task based on power and/or performance needs.

With continued reference to FIG. 1, in some cases, at least a processor 104 may implement a network-on-chip design. Host circuit 102 may interface or communicate with one or more additional devices as described below in further detail via a network interface device. Network interface device may be utilized for connecting host circuit 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

With continued reference to FIG. 1, a "memory," for the purpose of this disclosure, is a device used to store programs or data on a temporary or permanent basis for use in hosting circuit 102 or other computing devices. In some cases, memory 106 may include a space for data to be read or written. In a non-limiting example, memory 106 may include a random access memory (RAM). In some cases, RAM may include a dynamic RAM (DRAM) that stores each bit of data in a separate capacitor within hosting circuit 102 and being constantly refreshed to maintain the data. In other cases, RAM may include a static RAM (SRAM) that uses one or more flip-flops to store data (i.e., no need for refreshing). In one or more embodiments, memory 106 may be read only (i.e., ROM). Data that is stored in ROM may be hard-wired and cannot be easily altered or re-written. In some cases, memory may retain data even after the power of hosting circuit 102 is turned off; however, in some cases, data within memory 106 may be wiped and/or removed after host circuit 102 has been turned off and/or use of a particular software has been terminated. In some cases, memory 106 may be programmable. In some cases, user may erase memory 106 (with UV light) and reprogram memory 106. In some cases, memory 106 may include a flash memory e.g., USB drive, memory card, solid-state drive (SSD), or the like. In some cases, memory 106 may include cache memory, wherein at least a processor 104 may store data used most often in the cache memory, thereby making it instantly available to speed up the at least a processor 104. Other exemplary embodiments of memory 106 may include, without limitation, magnetic memory (e.g., hard disk drive [HDD]), optical memory, magnetic tape memory, phase-change memory (PCM), ferroelectric RAM (FeRAM or FRAM), and the like. In some cases, host circuit 102 may include one or more computing devices dedicated to data storage, security, distribution of traffic for load balancing, and the like. In a non-limiting example, memory 106 may include a secondary memory such as an HDD configured to be a long-term storage device in which an operating system and other information is stored. In some cases, data may be retrieved from secondary memory and transmitted to primary memory e.g., RAM during operation of host circuit 102.

With continued reference to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, host circuit 102 may distribute one or more computing tasks as described below across a plurality of computing devices of computing device, which may operate in parallel, in series, redundantly, or in any other manner used for distribution of tasks or memory between computing devices. Host circuit 102 may be implemented, as a non-limiting example, using a "shared nothing" architecture. In some cases, host circuit 102 may be designed and/or configured to perform any method, method step, or sequence of method steps in any embodiment described in this disclosure, in any order and with any degree of repetition. For instance, host circuit 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Host circuit 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, host circuit 102 operates a first partition 108a within a virtual environment 110. As used in this disclosure, a "partition" is a subdivision of a computer's resources (be it storage, memory, processing power, or any other resource) to create an isolated environment. In an embodiment, processes or tasks running in one partition may not interfere with those running in another. In some cases, partition may include memory partition (i.e., a section of a computer's RAM or storage), processor partition (i.e., a set of processor resources or cores), hardware partition (i.e., physical subdivision of host circuit 102 into smaller units), logical partition (i.e., a virtualization of a separate computer), or any combinations thereof. A "first partition," for the purpose of this disclosure, is a primary partition of a plurality of partitions 108a-c. In some cases, first partition 108a may include a boot partition from which an operating system loads or boots up. In some cases, first partition 108a may include a primary memory partition, wherein the initial memory allocation for a software to load as described below. In some cases, first partition 108a may also include a main processing partition, for example, first partition 108a may be responsible for primary tasks such as, without limitation, system management, control tasks, and/or the like as described herein.

With continued reference to FIG. 1, as used in this disclosure, a "virtual environment" is a self-contained environment within a computing device that allows for the isolation of one or more software from a host operating system (host OS). Host OS includes a primary operating system installed on host circuit's 102 hardware. In some cases, host OS may manage underlaying physical resources and facilitate the running of one or more guest operating systems (guest OS). In a non-limiting example, Linux operating system running on host circuit 102 as the primary operating system may be the host OS. Software applications integrated to host circuit 102 as described herein may be run atop Linux operating system. In some cases, virtual environment 110 may be software-defined, for example, and without limitation, virtual environment 110 may include a simulated operating system that operates independently of the underlaying physical hardware of host circuit 102. In some cases, virtual environment 110 may emulate one or more hardware, software, networks, or a combination thereof. In a non-limiting example, plurality of partitions 108a-c may be allocated in side virtual environment 110, wherein each partition of plurality of partitions 108a-c may include a virtual machine (VM), wherein the "virtual machine," for the purpose of this disclosure, is a software-based emulation of a computer system that is capable of running one or more software applications as if they were running on physical hardware. For instance, and without limitation, virtual environment 110 may include a separate and isolated operating system on hosting circuit 102 that does not interact with host operating system.

With continued reference to FIG. 1, operating first partition 108a includes instantiating a hypervisor 112. As used in this disclosure, a "hypervisor" is a firmware that creates and manage virtual machines. In one or more embodiments, hypervisor 112 may include a software configured as a virtual machine monitor (VMM). In some cases, hypervisor 112 may be configured to allow a physical machine (host) such as host circuit 112 to run a plurality of operating systems simultaneously by virtualizing system hardware e.g., processors, memory, I/O devices, and/or the like. In a non-limiting example, hypervisor 112 may create one or more VMs wherein each VM may host a separate and isolated software operating environment (SOE). In some cases, hypervisor 112 may run directly on the hardware of hosting circuit 102 without reliance of an operating system. Instantiating hypervisor 112 may include launching or initializing hypervisor 112 in host operating system. In some cases, instantiation of hypervisor 112 may create virtual environment 110 wherein a plurality of partitions (i.e., VMs) can be run and managed. In an embodiment, hypervisor 112 may include a "type 1 hypervisor" that run independently of host operating environment. In a non-limiting example, hypervisor 112 may include a bare metal hypervisor that run directly on the host circuit's 112 hardware and manage one or more quest operating systems. Exemplary type 1 hypervisor may include, without limitation, MICROSOFT HYPER-V, VMWARE ESXI, XEN, and/or the like. In some cases, VMs created by type 1 hypervisor may communicate directly with the hardware of host circuit 102 rather than host operating system. In some cases, VMs created by type 1 hypervisor may not be susceptible to issues caused by the host operating system and/or other VMs in virtual environment 110. In a non-limiting example, one or more VMs may be isolated and unaware of existence of other VMs. In an embodiment, type 1 hypervisor 112 may allow for an increased performance wherein VMs within virtual environment 110 may communicate directly with hardware rather than through the intermediate host operating system. In a non-limiting example, type 1 hypervisor may allow one or more VMs to run simultaneously, wherein the failure of a first VM may not result in a failure of a second VM.

With continued reference to FIG. 1, in another embodiment, hypervisor 112 may include a "type 2 hypervisor" that runs atop host operating system similar to any other software applications. In one or more embodiment, hypervisor 112 may include a hosted hypervisor having resource allocation occurred right above host operating system. In some cases, type 2 hypervisor may rely on host operating system of host circuit 102, whereas in type 1 hypervisor as described above, may only rely on the hardware of host circuit 102. Exemplary type 2 hypervisor may include, without limitation, VMWARE WORKSTATION, ORACLE VIRTUAL BOX, and/or the like. In some cases, when instantiating type 2 hypervisor, at least a processor 104 may launch type 2 hypervisor that has been pre-installed similar to launching any software application. Once host OS is up and running, at least a processor 104 may then start type 2 hypervisor to create, manage and run VMs atop the host OS; however, for type 1 hypervisor, since it runs directly on "bare metal" (i.e., hardware without requiring an underlying operating system), instantiating type 1 hypervisor may involve booting the system from a medium such as, without limitation, a USB drive, CD, or a network source containing hypervisor 112. Once booted, hypervisor 112 may take control of at least a portion of hardware resources and manage and/or launch one or more VMs.

With continued reference to FIG. 1, at least a processor 104 may then generate a virtualization layer 114 supervised by hypervisor 112, wherein first partition 108a within virtual environment 110 is operated by the virtualization layer 114. As used in this disclosure, a "virtualization layer" is a software layer (or interface) that sits between hardware layer (e.g., physical CPU, memory, I/O devices, and/or the like) and virtual environment 110 having one or more VMs. In some cases, virtualization layer 112 may be configured to virtualize the underlaying hardware resources and present the virtualized hardware resources to plurality of VMs as though they are dedicated to each VM. In a non-limiting example, plurality of partitions as described herein may share the same physical hardware resources through virtualization layer 114, without being aware of each other. In some cases, virtualization layer 114 may be instantiated when hypervisor 112 is booted or launched. In a non-limiting example, in case of a type 1 hypervisor, virtualization layer 114 may be generated when machine starts up since hypervisor 112 directly interface with hardware. In another non-limiting example, in case of a type 2 hypervisor, virtualization layer may be established once hypervisor software is initiated on top of host OS. In some cases, hypervisor 112 may be configured to monitor and manage one or more hardware abstraction and allocate these virtualized resources to designated VMs. In a non-limiting example, virtualized resources may include CPU time, memory space, I/O operations and/or the like. In some cases, virtualized resources may be allocated based on partition policy as described in detail below. In some cases, hypervisor 112 may manage the scheduling of VM tasks on actual cores. In some cases, hypervisor 112 may handle interruptions, exceptions, and any events that occur, deciding which VM or service needs attention. In some cases, hypervisor 112 may be configured to isolate one or more VMs from rest of VMs to maintain system security and stability. In other cases, hypervisor 112 may be configured to manage lifecycle operations of one or more VMs such as, without limitation, creation, modification, deletion, migration, and/or the like.

With continued reference to FIG. 1, in a non-limiting example, when first partition 108a is created, a pre-defined set of virtual hardware resources may be provided by virtualization layer 114, wherein the pre-defined set of virtual hardware resources may include, but is not limited to cores, portion of virtualized memory, virtual disks, virtual network interfaces, among others. As first partition 108a attempts to execute one or more operations or access its "hardware," first partition 108a may actually interfacing with virtualization layer 114, for instance, and without limitation, when VM tries to use at least a processor 104, it may be scheduled by hypervisor 112 onto physical processor on hosting circuit 102 through virtualization layer 114. In some cases, first partition 108a may perceive these resources as if they are dedicated hardware components, oblivious to the abstraction layer beneath. In some cases, virtualization layer 114 may handle I/O operations, translating virtual disk or network accesses to actual operations on the physical hardware. Any interruption, exception, or system call made by first partition 108a may be intercepted by virtualization layer 114 which then communicates with hypervisor 112 to handle or service that request.

With continued reference to FIG. 1, in some cases, hypervisor 112 may include single root input output virtualization (SR-IOV). "Single root input output virtualization" for the purposes of this disclosure is a software capability in which single Peripheral component interconnect express (PCIe) devices may be virtualized into multiple virtual devices. For example, and without limitation, a network adapter may be virtualized wherein multiple virtual adapters may exist. In one or more embodiments, SR-IOV may include the virtualization of physical components such as but not limited to, a GPU, network adapter, storage controllers, FPGA devices, audio processing cards, solid state drives and the like. In one or more embodiments, SR-IOV may allow for partitions to access a single physical device. In one or more embodiments, first partition 108a may have direct access to a physical device without an operating system allocating resources. In one or more embodiments, SR-IOV may allow for the sharing of resources, such as for example network adapters, while still maintaining independence. In one or more embodiments, SR-IOV may allow for multiple VMs operating on a hypervisor 112 e.g., type 1 hypervisor to have access to physical devices without an intermediary such as a shot operating system. In one or more embodiments, host circuit 102 may contain physical hardware that is capable of virtualization. In one or more embodiments, hypervisor 112 may contain the proper systems and/or software to enable SR-IOV wherein VM may receive a virtual component. In one or more embodiments, SR-IOV may allow for one or more separate virtual environments with direct access to one or more physical hardware components of hosting circuit 102.

With continued reference to FIG. 1, in some embodiments, plurality of partitions 108a-c may include at least a dedicated partition, wherein one or more I/O operations may be consolidated into the at least a dedicated partition. In some cases, such partition may include a specialized VM that is configured to manage and handle I/O operations for other VMs, acting as an intermediary between plurality of partitions and/or quest VMs and physical hardware resources through an I/O physical bus e.g., a virtualized PCI bus that connects devices to main system. In a non-limiting example, at least a dedicated partition may include a I/O VM containing a plurality of FACE I/O service segments (IOSS), wherein each IOSS may provide a standardized interface between OSS and platform-specific hardware. I/O VM may be configured to manage all I/O operations in adherence to FACE technical standards as described above. In a non-limiting example, through plurality of IOSS, I/O VM may include a VM that interface directly with platform's avionic hardware connected to host circuit 102 in a way that is standardized across different air vehicles and systems. In some cases, standardized device drives and/or adapters may be provided by IOSS for various avionic devices. For example, when a quest VM or a software application integrated into the system as described below wants to access a hardware resources, it may be configured to indirectly communicate with the I/O VM, plurality of IOSS having standardized drivers for the hardware may process the request as per pre-defined system specification (e.g., FACE specification). In these cases, other partitions or VMs may be less susceptible to I/O-related faults or security breaches. Security protocols may be standardized and attach surface may be reduced by centralizing drivers and I/O operations since other VMs do not directly access I/O hardware, reducing potential vulnerabilities. In other cases, updates or changes to one or more I/O device drivers or I/O related services may be done in I/O VM without affecting or rebooting the rest of VMs.

With continued reference to FIG. 1, at least a processor 104 is configured to receive a configuration request 116 from first partition 108a, wherein the configuration request 116 includes at least a partition policy 118 and a software image 120. As used in this disclosure, a "configuration request" is a structured set of data or a command to provide a specific operational environment or resources. In some cases, configuration request 116 may be send by a software entity as described below or component such as, without limitation, a partition within virtual environment 110, asking another entity such as, without limitation, host OS or hypervisor 112 to establish, modify, or provide a desired SOE. In a non-limiting example, first partition 108a may include a management VM configured to monitor, manage, and/or administer overall operations and resources within virtual environment 110. In a non-limiting example, first partition 108a may include, or at least interfacing with one or more health monitors, system health management PSSS, aircraft system monitoring PCS, operational mode management PCS, and/or the like.

With continued reference to FIG. 1, a "partition policy," for the purpose of this disclosure, is rules, constraints, and configurations for how a partition (or a virtual machine/container) within virtual environment 110 accesses resources. In some cases, at least a partition policy 118 may specify how much CPU, memory, storage, network bandwidth and/or the like a partition in question can utilize. In some cases, at least a partition policy 118 may also determine the scheduling policy for a partition, for example, the partition's priority, operating time, or whether it's preemptable. In an embodiment, at least a partition policy 118 may define a level of separation between plurality of partitions to ensure that one partition's operation doesn't adversely impact another's. In such embodiment, this may prevent failures from propagating. In some cases, partition policy may also outline what resources e.g., I/O devices, data files, network interfaces, and/or the like partition may be able to access. In some cases, partition policy may include a level of access (e.g., read, write, execute, and the like). In a non-limiting example, in an aviation system, at least a partition policy 118 may be configured to ensure that a partition handling flight control logic gets a highest priority and is isolated from partitions handling non-critical tasks e.g., in-flight entertainment. In another non-limiting example, partition policies may balance computing resources allocation for achieving a desired system performance e.g., desired energy efficiency, ensuring that each VM get only the resources it needs.

With continued reference to FIG. 1, a "software image," also known as a "container image," as described herein, is a snapshot or a packaged representation of an entire software state, including executable code, configurations, dependencies/libraries, and other required data. In some cases, software image 120 may include source code, libraries, and other software components that the software relies on. In some cases, software image 120 may include one or more configuration files which define a plurality of settings, parameters, and other configurations for the software. In some cases, configuration files may include certain OS configurations, environmental variables, or other system-level settings. In a non-limiting example software image 120 may include a portable executable image combined with a manifest file that is used by a container manager as described below to deploy the software image 120 on an operating environment with appropriate data services and restrictions. In some cases, first partition 108a may interface with a software image repository containing a plurality of software images. In some cases, software image 120 may be used to package a software application with its entire collection of dependencies, ensuring that the software application can run consistently across different SOEs. Exemplary software applications may include, without limitation, flight management system (FMS) software, air traffic control (ATC) software, avionics software, electronic flight bag (EFB) software, ground support equipment software, weather forecasting and reporting software, cockpit display rendering software, and/or the like. In some cases, software image 120 may include a VM image that encapsulate a whole OS along with one or more pre-installed software applications. Such software 120 may be easily replicated across a plurality of host circuits e.g., servers or cloud environment. In other cases, software image 120 may be used as a backup snapshot to restore/roll back system or a software application to a known working state.

With continued reference to FIG. 1, software images 120 includes a pre-defined operational rule 122. As used in this disclosure, a "pre-defined operational rule" is a set of instructions or conditions that dictate how the software, when executed, should behave, respond, or operate under specific scenarios or environment. In a non-limiting example, pre-defined operational rule 122 may encapsulate business logic or functional requirements of the software. In some cases, pre-defined operation rule 122 may specific a plurality of core functionalities and processes the software is intended to perform. In some cases, per-defined operational rule 122 may include one or more error handling procedures i.e., how software should respond to unexpected inputs or errors. In some cases, pre-defined operational rule 122 may include one or more security protocols such as, without limitation, instructions related to authentication, authorization, data protection, and/or the like. In some cases, pre-defined operational rule 122 may, additionally, or alternatively, include one or more conditions and/or thresholds for software performance e.g., response times, execution times, and/or the like. In an embodiments, pre-defined operation rule 122 may be configured as a metric to ensure that the software application behaves in a pre-defined way. In another embodiment, pre-defined operation rule 122 may dictate fail-safe behaviors or fallback procedures. In a non-limiting example, a pre-defined operation rule may dictate how a software application should respond if one or more sensors communicatively connected to host circuit 102 detects a certain anomaly in flight data during cruising e.g., automatically engaging an emergency procedure. In another non-limiting example, a pre-defined operational rule may specify the process and validations for pilot inputs. In some cases, missing pre-defined operation rule 122 may result in a failure to execute at least a part of the software application. In some cases, pre-defined operational rule 122 may entirely depend on system health and safety; for example, and without limitation, pre-defined operational rule 122 may be qualified under DO-178C or to ensure the availability, robustness, and integrity of the SOE.

With continued reference to FIG. 1, additionally, or alternatively, configuration request 116 may be encrypted, by first partition 108, prior to the transmission. In one or more embodiment, first partition may implement one or more aspects of a cryptographic system, wherein the cryptographic is a system that converts data e.g., configuration request 116, from a first form, known as "plaintext," which is intelligible when viewed in its intended format, into a second form, known as "ciphertext," which is not intelligible when viewed in the same way. In some cases, configuration request 116 may be unintelligible in any format unless first converted back to plaintext. Such process of converting plaintext into ciphertext is known as "encryption." In some cases, encrypting configuration request 116 may include the use of a datum, such as an "encryption key," to alter plaintext configuration request 116. In some cases, at least a processor 104 (and first partition 108) may convert ciphertext back into plaintext, which is a process known as "decryption." At least a processor 104 may be configured to decrypt configuration request 116 upon receipt. Decrypting configuration request 116 may include the use of another datum, such as a "decryption key," to return the ciphertext to original plaintext form. In some embodiments, cryptographic system implemented by first partition 108a may include a "symmetric cryptographic system," wherein the decryption key may be essentially the same as encryption key. In a non-limiting example, possession of either key may make it possible to deduce the other key quickly without further secret knowledge. In some cases, encryption and decryption keys in symmetric cryptographic systems may be kept secret and shared only with trusted entities such as, without limitation, trusted partitions and/or at least a processor 104. In a non-limiting example, first partition 108a may include an Advanced Encryption Standard ("AES"), which arranges configuration request 116 containing partition policy 118 and software image 120 into matrices and then modifies the matrices through repeated permutations and arithmetic operations with an encryption key.

With continued reference to FIG. 1, in some cases, first partition 108a may include an asymmetric cryptographic system, wherein either encryption or decryption key cannot be readily deduced without additional secret knowledge, even given the possession of a corresponding decryption or encryption key, respectively. In a non-limiting example, first partition 108a may implement a "public key cryptographic system," in which possession of the encryption key does not make it practically feasible to deduce the decryption key, so that the encryption key may safely be made available to the public e.g., all partitions within virtual environment 110. In some cases, public key cryptographic system may include RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. In some cases, first partition 108a may employ an elliptic curve cryptography, wherein the elliptic curve cryptography may rely on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some cases, configuration request 116 may be configured to initiate an encrypted handshake between two partitions or between a partition and an external system, wherein such handshake may involve an exchange of one or more encrypted messages to verify the identity of parties involved. In a non-limiting example, first partition 108a may send configuration request 116 to at least a processor 104 to initiate a secure connection with a second partition as described in detail below using transport layer security (TLS) protocol, wherein both partitions prove their identities to each other using encrypted keys. In some cases, configuration request 116 may specify that data stored or transmitted by one or more partitions should be encrypted using AES as described above. In a non-limiting example, configuration request 116 may dictate that any data saved to disk by one or more partition must be encrypted with AES-256 key. Only parties with the decryption key may transform the ciphertext back into plaintext when reads. In some cases, when two different keys are involved, one or more partitions may use private keys to decrypt messages encrypted with corresponding public keys.

With continued reference to FIG. 1, in one or more embodiments, at least a processor 104 may be configured to verify the integrity of data or to ensure that configuration request 116 hasn't been tampered with using cryptographic hashes, also referred to by the equivalent shorthand term "hashes." A cryptographic hash, as used herein, is a mathematical representation of data, such as configuration request 116 and data thereof, wherein the mathematical representation is produced by a lossy "one-way" algorithm known as a "hashing algorithm." In some cases, hashing algorithm may be a repeatable process; that is, identical data may produce identical hashes each time they are subjected to a particular hashing algorithm. Since hashing algorithm is a one-way function, it may be impossible to reconstruct a lot of data from a hash produced from a lot of data using the hashing algorithm. In some cases, hashing algorithm may include one or more processes that reconstruct the full data from the corresponding hash using a partial set of data from the full data may be possible only by repeatedly guessing at the remaining data and repeating the hashing algorithm; it is thus computationally difficult if not infeasible for a single computer to produce the data, as the statistical likelihood of correctly guessing the missing data may be extremely low. In a non-limiting example, when configuration request 116 is sent, a SHA-256 hash of the request may be generated and sent alongside. At least a processor 104 or receiving partition may hash the received configuration request using the same algorithm and check if the hashes match to verify the data integrity.

With continued reference to FIG. 1, at least a processor 104 is configured to create a second partition 108b within virtual environment 110 as a function of configuration request 116. As used in this disclosure, a "second partition" is a separate, distinct operating space within virtual environment 110, created in response to configuration request 116, distinct from first partition 108a as described above. At least a processor 104 is configured to allocate a dedicated execution time slide 124 and a private static memory space 126 for second partition using hypervisor 112 based on at least one partition policy 118 as described above. In a non-limiting example, partition policy 118 may follow a particular partitioning design in which the partitioning is provided above a minimal kernel as described in detail below with reference to FIG. 2 with specific resource guarantees. As used in this disclosure, a "dedicated execution time slice" is an allocation of processor time. In one or more embodiments, hypervisor 112 described herein may be configured to create plurality of partitions in a real-time operating system (RTOS) and virtual environment 110. In a non-limiting example, host OS may include a RTOS, wherein the RTOS is an operating system that is designed to serve real-time software applications that process data without buffer delays. In some cases, RTOS may include a tolerate processing delays. In a non-limiting example, dedicated execution time slice may include a guaranteed access to CPU time within a defined schedule for designated partition e.g., second partition 108b. Virtualization layer 114 may allow multiple OS to share single hardware host i.e., host circuit 102, wherein the hypervisor 112 within virtualization layer 114 may be responsible for managing CPU resources among plurality of partitions 108a-c. In a non-limiting example, one or more scheduling algorithms e.g., round-robin, rate-monotonic, earliest deadline first, and/or the like may be used to allocate CPU time to second partition 108b. In some cases, hypervisor 112 may enforce execution time slide so that each partition receives desired processor time it requires to execute at least one operational rule 122 as described above within its allotted window. In some cases, second partition 108b may be temporal isolated from other partitions, thereby preventing second partition 108b from hogging at least a processor 104 through virtualization layer 114 and causing performance degradation in other partitions within virtual environment 110. In some cases, one or more machine learning models as described below may be used to intelligently determine a desired execution time slide based on received software image 120 and/or at least one operational rule 122.

With continued reference to FIG. 1, as used in this disclosure, a "private static memory space" is a fixed amount of memory allocated to a specific partition that is not shared with or accessible by other partitions. In some cases, hypervisor 112 may be configured to spatial isolated second partition 108b from other partitions within virtual environment through such memory allocation. This may be done, at least in part for one or more performance and/or security purposes. In a non-limiting example, upon creating second partition 108b, hypervisor 112 may configure system's memory management unit (MMU) as described above to allocate at least a block of physical memory to second partition 108b according to partition police 118. In some cases, private static memory space may be made exclusive to second partition 108b, meaning that no other partitions may read from or write to this space. In some cases, the size of memory block may not change dynamically; it may be defined at the time when configuration requested is received by at least a processor 104 from first partition 108. In a non-limiting example, the size of private static memory space may remain constant throughout second partition's 108b lifecycle. Additionally, or alternatively, hypervisor 112 may read partition policy 118 upon system initialization or when a request to create a new partition is received. Hypervisor may then configure hardware resources through virtualization layer according to partition policy 118. In a non-limiting example, partition policy 118 may include a default partition policy that specifies a partition should have at least 256 MB or RAM and 10 ms of CPU time every 100 ms to perform its intended functions. In one or more embodiments, memory 106 may be partitioned into a root partition (also known as a parent partition) and one or more child partitions. In some cases, only root partition may include host OS.

With continued reference to FIG. 1, at least a processor 104 is configured to integrate a software module 128 into virtual environment 110 using pre-defined operational rule 122 by instantiating, within second partition 108b, software image 120 into at least one container 130, wherein the at least one container 130 comprises a non-preemptable container runtime 132. As used in this disclosure, a "software model" is a distinct unit of software that is composed of one or more computer programs designed to perform at least one particular function or a set of functions. In some cases, functions may be provided by at least one operational rule 122. In some cases, software module 128 may interact with other components via one or more interfaces (e.g., APIs). In an embodiment, software module 128 may be designed to be reusable and to provide certain functionality that may be integrated into one or more different operating systems or larger software applications. In a non-limiting example, at least one operational rule 122 may include a series of rules or polices that dictate how software module 128 interacts with the system and/or the users, this may include, without limitation, utilize computational resources, how it is executed, and/or the like. In a non-limiting example, in SCOE, such as avionics system as described herein, at least one operational rule may ensure that software module 128 does not interfere with any operation of other system components e.g., partitions within virtual environment 110, that software module 128 may uses dedicated system resources e.g., dedicated execution time slice 124, private static memory space 126, or one or more other functionalities or services provided by other partitions within virtual environments 110 such as plurality of third partitions 108c, in a way that does not degrade system performance, and that software module 128 may run within certain safety and security measurements as described in detail below.

With continued reference to FIG. 1, as used in this disclosure, a "container" is an executable package of software image 120 that includes all necessary elements needed to run it in any SOE. For example, and without limitation, at least a container 130 may include code, runtime, system tools, system libraries, configurations, and/or the like. In some cases, at least a container 130 may provide a "second layer" isolation or protection from virtual environment 110 and other containers and/or partitions. In one or more embodiments, at least a container 130 may include a standard unit of software that packages up code and all its dependencies so the integrated software module 128 may run under a desired performance from one SOE to another. In some cases, at least one container 130 may be created based on software image 120 as described above. In a non-limiting example, first partition 108a may include a container manager 134, wherein the "container manager," for the purpose of this disclosure, is a component used to manage and/or orchestrate a plurality of containers. In some cases, each partition of plurality of partitions 108a-c, especially in second partition 108b, may include a containerized application environment. In some cases, container manager 134 may be configured to create and further deploy one or more containers on second partition 108b. In some cases, plurality of containers may be run simultaneously. In an embodiment, container manager 134 may include an engine that provide at least an operating system e.g., CentOS, Debian, Fedora, RHEL, Ubuntu, Windows, MacOS, and/or the like, wherein the engine may enable one or more containers to run in any partition or virtual environment 110 consistently. In some cases, container manager may also be configured to validate the authenticity of software images, load container executables into container environments, connect container environments to operating service, and exports management APIs to other system management tools. In some cases, each partition may include a container manager, and plurality of container managers of plurality of partitions may be (indirectly) communicative each other. In some cases, container manager at second partition 108b and/or third partition 108c may be known as "container agent." In a non-limiting example, software image 120 may become a container at runtime-when it is running on the container agent.

With continued reference to FIG. 1, a "non-preemptable container runtime," as described herein, is a runtime that once at least one container 130 is up and running, it cannot be interrupted or preempted by other processor. In cases where at least one container 130 is running at RTOS, certain level of service or response time may be guaranteed. In a non-limiting example, at least one container 130 may be granted access to at least a processor 104, memory 106, and other resources as described above according to partition policy 118 based its priority, and once software module 128 is running, it may have exclusive access to dedicated resources until it completes execution or a conclusion of dedicated execution time slice 124 as described above. In a non-limiting example, at least one operational rule 122 of software image 120 may specific one or more safety-critical tasks which must not be delayed or interrupted by other non-critical tasks running on other partitions. Exemplary embodiments of at least one container 130 may include a DOCKER container (that encapsulate any payload and dependencies into a single object", RTOS container, safety-certified container (designed to meet stringent certification requirements of regulatory bodies such as, without limitation, FAA or EASA), among others. In a non-limiting example, software image 120 may capture an FMS module, wherein the FMS module may be configured to perform critical functions related to navigation and flight planning defined by its operational rule 122. Such FMS module may be instantiated within a container in second partition 108b and run with a non-preemptable runtime to ensure that navigation calculations and related data processing are not interrupted to maintain safety of flight operations.

With continued reference to FIG. 1, in one or more embodiments, instantiating software image 120 into the at least one container 130 may include extracting software metadata 136 from software image 120, wherein the software metadata 120 may include a plurality of software configuration parameters 138 and a plurality of digital files 140. As used in this disclosure, "software metadata" is information related to software image 120. In a non-limiting example, software metadata may include a manifest file specifying software version number, required dependencies, configurations and/or the like. As described herein, "software configuration parameters" are parameters that dictate how software image 120 should be set up within a particular SOE. Exemplary software configuration parameters 138 may include, without limitation, one or more environment variables, service endpoints, port numbers, paths to necessary libraries or dependencies, and/or other configuration data necessary for software module 128 to run correctly within second partition 108b. In some cases, at least a processor 104 may configure container manager 134 within first partition 108a through virtualization layer 114 to initialize at least one container 130 within second partition 108b as a function of plurality of software configuration parameters 138 by preparing container environment i.e., non-preemptable container runtime 132 based on one or more software configuration parameters. This may be done, for example, by setting up correct file paths, configuring virtual network settings, installing required libraries, and/or the like based on plurality of software configuration parameters 138. Integrating software module 128 may further include deploying plurality of digital files 140 within the initialized container. As used in this disclosure, "digital files" are a set of files each containing at least a portion of at least one operational rule. In some cases, plurality of digital files 140 may include any files that necessary for the operation of integrated software module 128, for example, and without limitations, plurality of digital files 140 may include one or more executable files, libraries, scripts, certificates for securities, data files, and/or the like. Container manager 134 may place plurality of digital files 140 in correct directories, setting permission, prepare container agent to execute plurality of digital files. In some cases, container agent may load at least one operational rule 122 into non-preemptable container runtime 132. In a non-limiting example, at least one operational rule 122 may govern how software image 120 operates within at least one container 130 and second partition 108b e.g., interaction with other software applications, utilization of dedicated resources, response to certain events, among others.

With continued reference to FIG. 1, in some cases, second partition 108b may include a third-party application with a proprietary runtime environment. As used in this disclosure, a "third-party application" is a software application developed by an entity other than primary system vendor or integrator. In some cases, third-party applications may include additional, potential non-essential functions and may not be part of core system software. In some cases, third-party application may require a specific runtime environment to function, as known as the "proprietary runtime environment." In some cases, proprietary runtime environment may include one or more libraries, services, and other dependencies that are unique to applications, and not necessarily shared with other parts of the system. In an embodiment, proprietary runtime environment may operate within second partition 108b and may be prevented from interfering with runtime environment of other partitions. In some cases, proprietary runtime environment may be provided by at least one container 130. In a non-limiting example, primary control system may operate in first partition 108b while in-flight entertainment applications (i.e., third-party application with its proprietary runtime) may operate in second partition 108b, hosted in at least one container 130, given a dedicated set of resources and may only communicate with rest of system e.g., first partition 108a in pre-defined ways that do not jeopardize integrity or security of flight systems. In such embodiment, hypervisor 112 may be configured to maintain strict isolation between partitions while allowing necessary levels of communication for the system to function as a whole.

With continued reference to FIG. 1, in some cases, plurality of partitions 108a-c may include a plurality of third partitions 108c. As used in this disclosure, a "third partition" is another isolated and encapsulated space within virtual environment 110 designed to run specific services. In some cases, services may include APIs, libraries calls, system calls, and other functionalities that may be required by second partition 108b and/or first partition 108a. In one or more embodiments, plurality of third partitions 108c may include one or more service VMs, wherein the service VMs are dedicated VM (similar to first partition 108a and second partition 108b as described above) that runs background services necessary for the operation of system or integrated software module 128. In some cases, services may not interface directly with second partition 108b and/or its end-user. In some cases, services may also include monitoring, and other platform-level functions. In an embodiments, third partition 108c may include a platform service segment (PSS) 142. In some cases, PSS 142 may include a replica of PSSS as implemented in FACE as described above. In some cases, PSS 142 may include at least one platform service that provide one or more core functionalities to host OS or each non-preemptable container runtime 132 as described above; for instance, and without limitation, PSS 142 may be configured as a fundamental layer of services upon which integrated software module 128 may rely. In a non-limiting example, each third partition of plurality of third partitions 108c may include a distinct program executive office (PEO) aviation service. In some cases, PEO aviation service may include one or more aspects tailored to support specific needs of army aviation, possibly including logistical service, communication service, navigation service, or the like. In some cases, each third partition within plurality of third partitions 108c may be isolated from each other i.e., each service running within its partition cannot be compromised by activities in other partitions, including second partition 108b. In other cases, service may further include hardware interfacing services such as services communicating with sensors and actuators, to software services e.g., database management, network configuration, security services, and/or the like.

With continued reference to FIG. 1, in one or more embodiments, at least one third partition of plurality of third partitions 108c may host a database. In some cases, any data required and/or generated by first partition 108a and/or second partition 108b may be stored in a database. Exemplary data store in database may include, without limitation, keys, system logs, partition policy 118, software metadata 136, software cache, and/or the like. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in an embodiment, one or more third partitions may be together served as an interface layer that allows different integrated software to communicate with each other. In a non-limiting example, third partitions may include APIs that allow integrated software 128 to access platform services e.g., databases, networking, hardware interfacing and/or the like as described above without having to manage them directly. In another embodiment, one or more third partitions may include libraries (i.e., collections of pre-written code that software application can call upon to perform specific pre-configured tasks). In a non-limiting example, third partitions may include one or more cryptographic functions imported into the system for secure communications for second partition 108b. In yet another embodiments, plurality of third partitions 108c may include one or more tools such as, without limitation, compilers, debuggers, monitoring systems, or other software utilities that support development, deployment, and maintenance of software image 120 in second partition 108b. In yet another embodiment, third partition may be configured as a middleware that lies between first partition 108a and second partition 108c, providing services to integrated software module beyond those available from first partition 108a. In a non-limiting example, third partition as middleware may handle services such as message queuing, transaction management, or coordination of distributed systems. In such embodiment, third partition may act as a facilitator for communication and data management for second partition 108b. In some cases, plurality of third partitions 108c may work like a "back-end system" for second partition 108b and/or first partition 108a which may be "front-end" where users or operational interactions occurs. In other cases, first partition 108a may include a brokerage service for integrated software module 128, ensuring that data is passed correctly between different third partitions. In some cases, plurality of third partitions 108c may be built into virtual environment 110. In a non-limiting example, when hypervisor 112 is being first instantiated, hypervisor 112 may be configured to create one or more third partitions according to pre-defined configurations. Specific services may be imported or exported as needed. Configuration request 116 may include request for loading new services when software module 128 starts or ready to run. In some cases, services within plurality of third partitions 108c may be updated through a secure update process that is tightly controlled by first partition 108a to prevent introduction of vulnerabilities or errors.

With continued reference to FIG. 1, at least a processor 104, in case a multi-core processor as described above may be configured, in some cases, distribute the operation of the first partition 108a to a first core of plurality of cores and operate second partition 108b using a second core of plurality of cores. In some cases, first partition 108a e.g., a management VM may be assigned to operate on first core and second partition 108b e.g., an application VM may be assigned to operate on second core. In some cases, both partitions may be run in parallel without affecting performance of any partition. In some cases, such hardware isolation may prevent faults in one partition from affecting other which is crucial in SCOE. In a non-limiting example, plurality of second partitions may be distributed to plurality of cores. In some cases, a second partition A may be configured to run flight control system, while another second partition B may be running non-critical tasks e.g., in-flight entertainment, wherein entertainment system may never interfere with flight controls. In some cases, at least a processor 104 may allocate different cores to different partitions based on current load and performance requirement. In some cases, hypervisor 112 may be responsible for managing distribution of partitions across plurality of virtual cores through virtualization layer 114. In other cases, at least a processor 104 may employ core affinity settings, wherein certain tasks are "affined" or fixed to specific cores to prevent them from being shifted around, which may lead to variability in performance. Additionally, or alternatively, plurality of third partitions 108c may also be configured to operate on a designated set of cores.

With continued reference to FIG. 1, in some cases, virtualization layer 114 may include a virtual bus 144. As used in this disclosure, a "virtual bus" is a software construct that mimics the functionality of a physical bus. In an embodiment, (I/O) virtual bus 144 may include a virtualization of I/O physical bus that facilitates communication between different components within virtual environment 110 or even different virtual environments. In a non-limiting example, virtual bus 144 may connect first partition 108a with second partition 108b. In some cases, management VM (i.e., first partition 108a) may send one or more administrative commands to software module 128 (i.e., second partition 108b). Additionally, virtual bus 144 may also connect first partition 108a with plurality of third partitions 108c, allowing management VM to communicate with other ancillary or service-oriented partitions as described above. Virtual bus 144 may be set up in such a way that second partition 108b is isolated from direct communication with plurality of third partitions; this means that any communication to or from second software module 128 must go through first partition 108. In this case, software application running on second partition 108b may not be able to directly access or be accessed by one or more services or functions running on plurality of third partitions 108c. In a non-limiting example, plurality of third partitions 108c may include various utility services e.g., logging, diagnostics, communication, backup services, wherein the virtual bus may ensure second partition 108 e.g., flight navigation system can only communicate with a controller-management VM, and not directly with other utility services which may be less secure.

With continued reference to FIG. 1, in some cases, first partition 108 may include a logging mechanism 146. As used in this disclosure, a "logging mechanism" is a system or process that systematically records events, transactions, or other significant observations that occur within software systems, particularly integrated software module 128 e.g., software image 120 within non-preemptable container runtime 132. In some cases, logging mechanism 146 may be integrated directly into first partition 108a or any other partition that may be responsible for system management; in other words, at least one third partition of plurality of third partitions 108c may include an implementation of logging mechanism 146. In some cases, at least a processor 104 may implement a plurality of logging mechanism, each may be designated to monitor a particular event or activity within non-preemptable container runtime 132. In some cases, logging mechanism 146 may include privileges to monitor all system activities in addition to those within the non-preemptable container runtime 132. In an embodiment, logging mechanism 146 may monitor second partition's 108b through virtual bus 146 e.g., a communication channel that transmits data and events to be logged while maintaining isolation between partitions within virtual environment 110. In a non-limiting example, logging mechanisms may be configured to log start and stop times (e.g., when container or containers begin and end execution), resource usage (e.g., CPU, memory, I/O usage), security events (e.g., any authentication attempts, access control violations, or any other security relevant events), errors (e.g., errors thrown by container such as indicator of security concerns and operational issues), system calls (e.g., calls made from the container to host OS or from host OS to plurality of third partitions), and/or the like. In some cases, data and event to be logged may be received from container manager 134. Container manager may be continuously or periodically monitoring other container agents in partitions. In another non-limiting example, logging mechanism 146 may be configured to record detailed operation data for post-flight analysis and incident investigation. In some cases, logging mechanism 146 may include a data logging PSSS implemented from PEO Aviation Enterprise Architecture (EA) and FAF v4.0 interfaces.

With continued reference to FIG. 1, in one or more embodiments, host circuit 102 may be configured to initiate a secure boot process when the system, in some cases, is powered on or restarted. In some cases, host circuit 102 may include a trusted platform module (TPM), wherein the "trusted platform module," for the purpose of this disclosure, is a specialized chip on an endpoint hardware component (i.e., device) that store keys e.g., cryptographic keys such as encryption keys, decryption keys, public keys, private keys, or any key as described herein. In a non-limiting example, host circuit 102 may include a plurality of TPMs, each contain an RSA key pair known as "Endorsement key (EK)," wherein the RSA key pair may be maintained inside of a TPM and cannot be accessed by software module 128 (i.e., second partition 108b). In some cases, first partition 108a may include a bootloader (i.e., the first piece of software that runs). In some cases, bootloader may be verified, for example, one or more system firmware may be configured to check bootloader's digital signature before execution using keys e.g., public keys stored in TPM or another secure component. In case where bootloader's signature doesn't match, host circuit 102 may halt, preventing potential malicious partitions from running. Once bootloader is verified and executed, hypervisor 112 may be instantiated as described above. In some cases, hypervisor may be also verified through an associated digital signature to ensure its authenticity. In a non-limiting example, host circuit 102 may boot only with trusted and authenticated partitions e.g., first partition 108a and plurality of third partitions 108c. Second partition 124 may be verified before loading, or trusted version of second partition may be loaded. Hypervisor 112 may be configured to prevent any second partition 108b that yields a negative response during verification. In some cases, all events during the secure boot process as described herein, including, without limitation, any verification failures or anomalies, can be communicated to first partition 108a through virtual bus 144 and logged by logging mechanism 146 as described above. In some cases, these events may be alerted to certain users e.g., administrators. Additionally, or alternatively, in cases where verification fails, host circuit 102 may be configured to boot into a safe mode, attempting to restore a trusted software version, or simply halting at least a processor 104 and/or first partition 108a to prevent potential threats.

With continued reference to FIG. 1, a "digital signature," as used herein, includes a secure proof of possession of a secret by a signing device, as performed on provided element of data, known as a "message." A message may include an encrypted mathematical representation of a file or other set of data using the private key of a public key cryptographic system. In some cases, digital signature may be a secure proof. As used in this disclosure, a "secure proof," is a protocol whereby an output is generated that demonstrates possession of a secret, such as device-specific secret, without demonstrating the entirety of the device-specific secret; in other words, a secure proof by itself, may be insufficient to reconstruct the entire device-specific secret, enabling the production of at least another secure proof using at least a device-specific secret. In some cases, a secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

With continued reference to FIG. 1, in an embodiment, secure proof may be implemented using a challenge-response protocol. In an embodiment, this may function as a one-time pad implementation; for instance, at least a processor 104 or first partition 108a may record a series of outputs ("responses") produced by a partition possessing secret information, given a series of corresponding inputs ("challenges"), and store them securely. In an embodiment, a challenge-response protocol may be combined with key generation. A single key may be used in one or more digital signatures, such as signatures used to verify second partition 108b; the key may be discarded for future use after a set period of time. Secure proof may include encryption of a challenge to produce the response, indicating possession of a secret key. Encryption may be performed using a private key of a public key cryptographic system or using a private key of a symmetric cryptographic system; for instance, first partition 108a may verify response from second partition 108b by decrypting an encryption of challenge or of another datum using either a symmetric or public-key cryptographic system as described above, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

In some cases, digital signature may be verified by first partition 108a and/or at least a processor 104, using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature. In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature may be verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, in some cases, second partition 108*b* and/or one or more third partition 108*c* may be hosted in a cloud environment, remote to virtual environment 110 and first partition 108*a*. In an embodiment, apparatus 100 may leverage cloud-native technologies or hybrid cloud models to enhance scalability. In a non-limiting example, a dedicated set of resources configured to runs specific software, container 130, or other services, such as without limitation, VMs, containers, cloud services, and/or the like in cloud e.g., AWS, MICROSOFT AZURE, and/or the like (for example, AWS EC2 may offer one or more compute abstractions from VMs and/or containers e.g., KUBERNETES), may be analogues to second partition 108*b* as described herein. In such embodiment, software module 128 may be deployed to cloud infrastructure. In one or more embodiments, Zero-Knowledge proof may allow second partition 108*b* to prove to first partition 108*a* that a given response e.g., execution of at least one operational rule 122 is true and authenticated. In a non-limiting example, first partition 108*a* may perform one or more remote attestation protocols e.g., TPM attestations, wherein an entity may prove to a remote entity that its components e.g., firmware and/or software is trustworthy without disclosing specific details about the response, at least one operational rule 122, cryptographic keys, firmware, and/or software. In some cases, any sensitive or proprietary information related to second partition 108*b* may be verified to ensure it's running the correct software module 128 and hasn't been tampered with, all without revealing the specifics of such software module 128. In a non-limiting example, first partition 108*a* may be configured to utilize KUBERNETES to automatically deploy and manage software module 128 in cloud-based second partition 108*b*.

With continued reference to FIG. 1, in some cases, a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby an entity may check the validity of P. Zero-knowledge proof may include an interactive zero-knowledge proof, wherein entity verifying the proof e.g., first partition 108*a* must directly interact with the proving entity e.g., second partition 108*b*; for instance, the verifying and proving partitions may be required to be online, or connected to the same network as each other, at the same time. In a non-limiting example, this may be enabled by, at least in part, virtualization layer 114 and virtual bus 144 as described above. In some cases, interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 1, alternatively, zero-knowledge proof may include a non-interactive zero-knowledge, proof, or a proof wherein neither entity to the proof interacts with the other entity to the proof; for instance, first partition 108*a* receiving the proof and second partition 108*b* providing the proof may receive a reference datum which the partition providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one entity has control of the totality of the secret information used in the trusted setup; as a result, if any one partition generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 1, Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, additionally, or alternatively, first partition 108a may include a health manager 148. As used in this disclosure, a "health manager" is a component that actively checks the state of various system components to ensure the overall system is functioning correctly. In some cases, health manager 148 may be implemented in a way tailored to fault management and recovery strategies. In some embodiments, health manager may be configured to continuously observe operational status of both hardware components (e.g., hosting circuit 102, at least a processor 104, sensors connected to the processor 104, memory 106, and/or the like) and software components (e.g., software module 128, plurality of third partitions 108c, host OS, and/or the like) and check integrity of data and software running within partitions to ensure they are not corrupted or behaving erratically. In some cases, logging mechanism 146 may communicate with health manager 148 directly to record significant observations (e.g., recurring issues). In some cases, health manager 148 may perform one or more diagnostic checks to identify any potential issues, for example, health manager 148 may be configured to run self-tests or health checks at regular intervals or upon system boot-up. In some cases, diagnostic checks may be performed during secure boot as described above. In one or more embodiments, health manager 148 may generate one or more alerts or warnings when it detects issues that may impact system performance or safety. In some cases, one or more pre-defined rules may be used to escalate issues to appropriate level of attention, potentially triggering failover or redundancy mechanisms, if necessary, wherein pre-defined rules may be stored in database or a third partition as described above. In a non-limiting example, health manager 148 may include a real-time system health monitoring system configured to check operational readiness or one or more aircraft's avionics systems before takeoff and/or during flight, manage any in-flight anomalies, and support maintenance crew in identifying and resolving issue between flights. In some cases, health manager may include an aircraft system monitoring PCS, security event audit FACE PSSS, user authentication FACE PCS, operational mode management PCS, and/or the like implemented from PEO Aviation Enterprise Architecture (EA) and FAF v4.0 interfaces.

With continued reference to FIG. 1, at least a processor is configured to verify a compliance 150 of the integrated software module 128 with a plurality of pre-determined safety standards 152 sourced from a trusted repository 154 by monitoring an adherence of the software module 128 to the pre-defined operational rule 122 within non-preemptable container runtime 132 at the first partition 108a. As used in this disclosure, a "compliance" is a data element measuring a conformance of software module 128 to established guidelines or specifications designed to ensure the safety and reliability of software module 128 (especially within environment where failure may lead to significant harm or loss) known as "safety standards." In some cases, compliance 150 may include a quantitative value such as a score or a range of scores. In other cases, compliance 150 may include one or more binary representation, for example, "1" and "0" or "TRUE" and "FALSE," wherein "1/TRUE" may indicate software module 128 is compliant with at least one corresponding safety standard and "0/FALSE" may indicate software module 128 is non-compliant with the at least one corresponding safety standard. A "trusted repository," for the purpose of this disclosure, is a trust entity e.g., a secure storage or even a trusted (third) partition, wherein plurality of safety standards 152 are kept. In a non-limiting example, trust repository 154 may be considered authoritative and tamper-proof e.g., one or more secure databases, version control systems, and/or certified data centers. In an embodiment, at least a processor 104 may be configured to evaluate compliance 150 to ensure that integrated software module 128 may perform all functions specified to at least one operational rule 122. In a non-limiting example, at least a processor 104 may be configured to determine a design assurance level classification (DAL) associated with integrated software module 128 design assurance level classification (DAL) based on container runtime behaviors observed by container agent, container manager 134, health manager 148, or data record generated and managed by logging mechanism 146 (in real-time or near real-time).

With continued reference to FIG. 1, a "Design assurance level classification," as described herein, is a labeling of software based on the effects caused by a failure of the software module 128. For example, and without limitation, a software failure associated with a first software module which can potentially put human lives at risk may receive a particular classification whereas a software failure associated with a second software module which may, at most, slightly injure an individual may be given a differing classification. In one or more embodiments, each integrated software module may be associated with a particular DAL. DAL classification may range from A-E wherein a DAL-A classification may indicate software module 128 may cause death during failure, whereas as a DAL-E classification may indicate that there is no potential harm in the event of a software failure. In one or more embodiments, various software modules may be given classifications based on their inherent risk to cause harm to individuals. In one or more embodiments, the DAL of a software may indicate that one software module may require more testing, safety protocols and the like in comparison to other software modules. For example, a DAL-E classified software module may not require much testing as failure may not harm individuals, whereas a DAL-A may require stringent testing to ensure that failure does not occur. In one or more embodiments, each DAL certification may contain minimum resource requirements such as minimum processing power, minimum space allocation, and the like. In a non-limiting example, compliance 150 of software module 128 may be derived, at least in part, from determined DAL classification. In one or more embodiments, software data may contain DAL certification of at least one container 130.

With continued reference to FIG. 1, in some cases, compliance 150 may include an assessment of software module's 128 conformance to at least one operational rule 122 that dictate software module's 128 behavior, known as the "adherence." In a non-limiting example, at least one operational rule 122 may dictate how it must perform under various conditions to be considered compliant. In a non-limiting example, at least a processor 104 may be configured to verify the execution of software module 128. In some cases, at least a processor 104 may assign a high score to software module 128 which executed without interference e.g., functions within its runtime without being interrupted or influenced by other processes or partitions, maintaining strict timing and performance as per its safety standards. In another non-limiting example, at least a processor 104 may be configured to check the integrity of data processed e.g., software metadata 136 and/or data transmitted by software module 128 using one or more error-checking algorithm or secure data transmission protocols. In some cases, compliance 150 may include DO-178C for avionics, ISO 26262 for automotive safety, IEC 61508 for industrial system safety, and/or the like. In some cases, a high compliance 150 may indicate software module 128 adheres to standards e.g., RTCA/DO-178C for software in airborne systems. In some cases, high compliance 150 may include a certification of ISO 27001. In a non-limiting example, software module 128 such as a flight control system software may be rigorously tested and verified against DO-178C standard based on observed runtime behaviors through simulation and/or in-flight testing.

With continued reference to FIG. 1, at least a processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, at least a processor 104 may utilize a machine learning module 156 to implement one or more algorithms or generate one or more machine learning models to determine compliance 150 of integrated software module 128. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from trusted repository 154 as described above or any other databases, or even be provided by end-user. In a non-limiting example, machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In a further embodiment, training data may include previous outputs such that one or more machine learning models iteratively produces outputs.

With continued reference to FIG. 1, in one or more embodiments, verifying compliance 150 of integrated software module 128 may include training a machine learning model using runtime behavior training data, wherein the runtime behavior training data comprises a plurality of non-preemptable container runtime behaviors as input correlated to a plurality of compliance metrics as output, and generating a compliance matrix as a function of the non-preemptable container runtime behavior using the trained machine learning module. A "compliance matrix," for the purpose of this disclosure, is a data structure that map out requirements from one or more sets of pre-defined safety standards 152 sourced form trusted repository 154 or specifications to the elements or components of, for example, integrated software module 128, second partition 108*a*, or any other system or process that must meet those requirements. In some cases, compliance matrix may include a tabular data format, wherein a table having one axis lists requirements from safety standards and another axis listed software module's 128 features, components, and/or runtime behaviors identified by at least a processor 104. In some cases, compliance matrix may be filled in to visualize how and where each requirement is addressed. In some cases, at least one axis of said compliance matrix may indicate a compliance status determined by at least a processor 104 as described above corresponding to other axis. In some cases, at least a processor 104 may link specific parts of software metadata e.g., source code, design documents, test cases to individual pre-defined safety standard. In these cases, compliance matrix may be used as a cross-reference tool. In an embodiment, for software module 128 that must comply with DO-178 standards, a compliance matrix may be configured to map each software requirement to specific runtime behaviors, unit tests, or even code segments. In a non-limiting example, an exemplary embodiment of a compliance matrix is shown below:

| No. | Safety Standard | Compliance Status |
|---|---|---|
| 1 | Integrity of software image | Compliant/Non-compliant |
| 2 | Adherence to pre-defined operational rule | Compliant/Non-compliant |
| 3 | Absence of undesired interference | Compliant/Non-compliant |
| 4 | Absence of security vulnerabilities | Compliant/Non-compliant |
| 5 | Execution within allocated time slice | Compliant/Non-compliant |
| 6 | Execution within private static memory space | Compliant/Non-compliant |
| 7 | Authenticity of the software module | Compliant/Non-compliant |
| 8 | No unauthorized access or operations | Compliant/Non-compliant |
| 9 | Proper container instantiation | Compliant/Non-compliant |
| 10 | Conformance to data protection standards | Compliant/Non-compliant |

With continued reference to FIG. 1, in some cases, first partition 108a or at least a third partition of plurality of third partitions 108 may include a dedicated verification module implementing one or more compliance algorithms, configured as a "watchdog," continuously monitoring the adherence of software module 128 to assess compliance 150. In some cases, verification module may have access to trusted repository 154 containing plurality of pre-defined safety standards 152 which may include, without limitation, DO-178C for software in airborne systems, ISO26262 for automotive safety, DO-297 for supply chain management, and/or the like. In some cases, verification module may be configured to compare non-preemptable container runtime behavior against one or more above listed pre-define safety standards in real-time; for instance, and without limitation, this may include checking for correct execution of operational rule 122, proper use of system resources such as (dedicated execution time slice 124, private static memory space 126, and/or the like), adherence to security protocols, among others. In a non-limiting example, verification module may communicate with health manager 148 and/or logging mechanism 146 to monitor a wealth of data recorded. In some cases, verification module may be configured to analyze (e.g., using statistical methods or one or more machine learning algorithms as described herein) to detect any deviations from expected behaviors as defined by one or more safety standards 152. In a non-limiting example, at least a machine-learning process, for example, one or more machine learning models may be used to verify; one or more machine learning models may be trained to predict expected runtime behaviors and detect anomalies indicating potential compliance issue. Additionally, or alternatively, signature-based verification may be employed by verification module which use signatures or models created based on compliant behaviors against actual operational data and/or software metadata 136.

With continued reference to FIG. 1, in some cases, apparatus 100 may further include a software-defined intelligent network (SDIN) 158. In one or more embodiments, SDIN 158 may be a "smart" networking layer that may dynamically manage the connectivity and data flow between different system components, applications, partitions, and/or the like based on certain criteria, including, without limitation, compliance 150 of integrated software module 128. In some cases, SDIN 158 may include a network controller that control communication between plurality of partitions 108a-c within virtual environment 110 through virtualization layer 114 or hypervisor 112. In some cases, SDIN 158 may dynamically alter the connectivity between system components based on predefined rules, operational requirements, and/or real-time assessments such as compliance 150. In some cases, SDIN 158 may be configured to enforce one or more network polices that dictate how partitions interact, what bandwidth partitions are allocated, which partitions are permitted to communicate, and/or the like. In some cases, SDIN 158 may communicate with container manager 134 that continuously monitor the activity of each partition, and adjust connections between plurality of partitions 108a-c. In some cases, adjusting connections between plurality of partitions may be based on compliance matrix as described above. In a non-limiting example, network controller may be configured to selectively connect and/or disconnect partitions as a function of compliance matrix (e.g., compliance status). If second partition 108b is found to be non-compliant with one or more safety standards 152, network controller of SDIN 158 may selectively disconnect or isolate second partition 108b from the rest of system to prevent potential harm or interference with compliant partitions (e.g., first partition 108a and plurality of third partitions 108c). In some cases, adjustments of connectivity may include reconfiguring and/or updating second partition 108b to bring it back into compliance before restoring its connectivity. This may be done, for example and without limitation, through one or more rollback operation which returns second partition 108b to a previous compliant state.

With continued reference to FIG. 1, in one or more embodiments, SDIN 158 may employ machine learning module 156 which implementing one or more machine learning algorithms to predict and respond to network needs, detect anomalies that may indicate non-compliance, and automatically reconfigure connections for desired performance and safety. In a non-limiting example, one or more machine learning models may be generated by machine learning module 156 within SDIN 158 to predict potential compliance violations and proactively adjust connections before actual violations occur. In some cases, when second partition 108b becomes non-compliant, SDIN 158 may automatically initiate procedure to bring it back into compliance such as triggering a security scan for vulnerabilities, or a configuration update as described above. For example, in an avionics system designed with modular architecture as described herein, wherein each second partition of a plurality of second partitions integrated into the system performs a distinct function—navigation, communication, in-flight entertainment, weaponry, and/or the like. These partitions may be interconnected by virtual bus 144 as described above, wherein the SDIN 158 may have privileges to configure hypervisor 112 to manage virtual bus connection between plurality of partitions within virtual environment 110 through virtualization layer 114. During a routine check, SDIN 158 may detect that in-flight entertainment system may be running outdated software that may have one or more vulnerabilities. In order to prevent any potential risk to aircraft's operations, SDIN 158 may be configured to immediately disconnect in-flight entertainment system so that it may no longer communicate with navigation or communication modules. In some cases, SDIN 158 may reroute passenger devices to a limited network that keeps them disconnected form main avionics but allows for basic functionality such as internet browsing capabilities. In some cases, machine learning module 156 may lean from historical incident and updates one or more predictive machine learning models to better anticipate potential compliance lapses. In other cases, users e.g., pilots, technicians, network administrators, passengers may provide user feedback to support SDIN's decision making; for example, user may choose to "trust" or "don't trust" a software module 128. In some cases, machine learning module 156 may adapt to user feedback to adjust models' parameters, thereby reducing false positives or be more aligned with user expectations and expertise.

With continued reference to FIG. 1, additionally, or alternatively, SDIN 158 may be configured to direct traffic on a network. In contrast to hardware components such as routers which may control a network through hardware, SDIN 158 may be used to dynamically control a network through integrated software module 128. In one or more embodiments, SDIN 158 may be used to control a network wherein data packets may be routed using SDIN 158. In one or more embodiments, SDIN 158 may act as an intermediary between software application or software and a network wherein the SDIN may control the software module 128 interacts with the network. In some cases, SDIN 158 may be used to monitor and control network conditions. In one or more embodiments, SDIN 158 may be used to manage network resources for at least one container 130. In some cases, at least one container 130 may be limited in network resources due to their level of importance; such that container running less important software image do not crowd a network for less important matters. In a non-limiting example, SDIN 158 may ensure an enablement of one or more dynamic mesh networks, and facilitate assured, secure data sharing across Link-16, BFT, 4586, and RAC2.

With continued reference to FIG. 1, in some embodiments, memory 106 may include one or more cache as described above, containing one or more cache entries. As used in this disclosure, a "cache entry" is a dingle storage location within a cache. In some cases, each entry in cache may include actual data retrieved from main memory that at least a processor 104 may need again soon. In one or more embodiments, cache entry may include a part of a program code, or any data generated or required by integrated software module 128 or Host OS that has been accessed recently. In some cases, cache entry may include an address tag which is used to identify which data from main memory 106 is currently stored in cache entry. In a non-limiting example, when at least a processor 104 looks for data, it may be configured to check address tag to determine if the data is present in cache. In some cases, one or more control bits (i.e., flags that provide additional information about cache entry) such as, without limitation, whether data has been modified i.e., (dirty bit), whether the data is valid (valid bit), or if it has been recently accessed (used for replacement polices like Least Recently Used [LRU]). In a non-limiting example, after second partition's execution time slice 124 concludes, cache entries that may be used by second partition 108b may be cleared, ensuring any sensitive data is not accessible to any other partitions or entity that may access same CPU core and cache thereafter. In some cases, at least a processor 104 may be configured to invalidate (i.e., clear) cache entries upon the end of dedicated time slice 124. In some cases, invalidating one or more cache entries may include marking control bit of the cache entries as "invalid" so any subsequent attempts to access cache entries will result in a cache miss, preventing unauthorized access from other partitions outside the process. In a non-limiting example, once a critical navigation calculation is over, temporary computation results may be stored in cache. At least a processor 104 may be configured to ensure such computation results can't be accessed by third-party entity or other partitions that running in other partitions. Once aircraft lands at its destination, cache entries may be automatically invalidated, returning cache to a clean state with no residual data from flight management system left in cache.

With continued reference to FIG. 1, at least a processor 104 may be configured to display integrated software modules, recorded logs, compliance matrix, and/or the like on a single display screen 160. "Display Screen" for the purposes of this disclosure is a device configured to show visual information. In some cases, display screen 160 may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display screen may include a separate device that includes a transparent screen configured to display computer generated images and/or information. In a non-limiting example, display screen may include one or more pilot display e.g., primary flight display (PFD) in an aircraft's cockpit. In some cases, display screen 160 may be part of Electronic Flight Instrument System (EFIS) which may include, without limitation, attitude indicator, airspeed indicator, altimeter, vertical speed indicator, heading indicator, turn coordinator, navigation display, autopilot status, traffic information, system warnings and alerts, debugging window, and/or the like. In some cases, display screen 160 may be configured to visually present one or more data through a graphical user interface (GUI) to a user, wherein a user may interact with the data through GUI. In one or more embodiments, one or more VMs may be projected simultaneously on display screen 160, for example, one or more indicators indicating VMs are up and running may be displayed at the same time on display screen 160. In one or more embodiments, each portion of display screen 160 may visually display a single partition projection, wherein multiple projections of plurality of partition 108a-c may exist on a singular display screen 160. In one or more embodiments, recorded logs, compliance matrix, and any relevant data may be accessed through one or more software and/or system components as described above and displayed through display screen 160. In one or more embodiments, display screen 160 may be configured to display the GUI of hypervisor 112. In one or more embodiments, GUI of host OS may also be displayed. In one or more embodiments, hypervisor 112 may include one or more remote software that may allow for access to one or more partitions on single display screen 160. In one or more embodiments, remote software may allow for visualization of integrated software module 128 on single display screen 172. In some cases, at least a third partition of plurality of third partitions 108*c* may host a graphics services PSSS designed to configure display screen 160 to display desired data as described herein.

Figure 2:
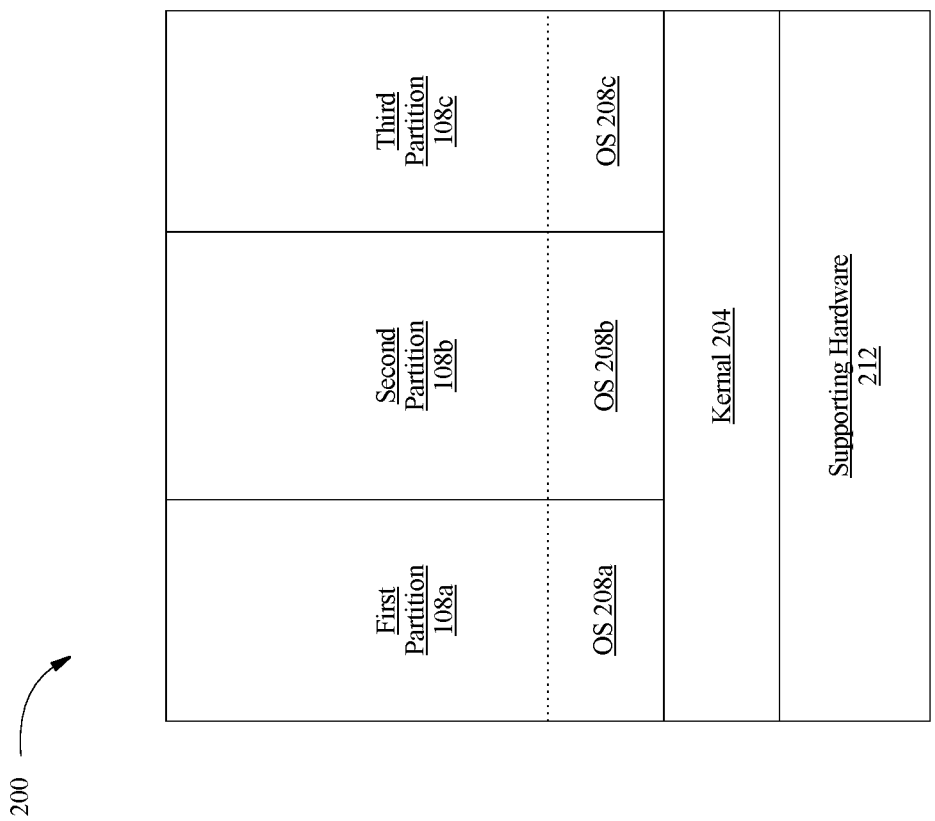
FIG. 2 is a block diagram illustrating an exemplary partitioning design.

Now referring to FIG. 2, an exemplary partitioning design 200 is illustrated. In some cases, apparatus 100 may employ an approach of partitioning above a minimal kernel 204. As used in this disclosure, a "minimal kernel: is a core subset of an OS that provides only the most essential services required for basic operation. In an embodiment, minimal kernel 204 may be lightweight; for instance, and without limitation, minimal kernel may be designed to have a minimal attack surface and reduced potential for bugs and errors. In some cases, processor 104 may be configured to create one or more isolated partitions e.g., first partition 108*a*, second partition 108*b*, third partition 108*c* or virtual environment 110 on top of, or using the services of, minimal kernel 204. In a non-limiting example, one or more software applications and/or tasks (i.e., second partition 108*b*) may be partitioned according to such partitioning design 200 to ensure that these software applications and/or tasks do not interfere with each other, especially if they have different safety or security requirements. In some cases, when partitioning is done "above minimal kernel," each partition of plurality of partitions 108*a-c* may run under a corresponding OS 208*a-c*, wherein each OS may be provided separately in each partition. In these cases, plurality of partitions 108*a-c* may rely only on kernel 204 and its supporting hardware 212. Plurality of partitions 108*a-c* and their corresponding OS 208*a-c* may be separated by hypervisor 112 in consistent with SCOE design patterns as described above with reference to FIG. 1. Each partition of plurality of partitions 108*a-c* may have the ability to run a completely independent instance of an OS.

Figure 3:
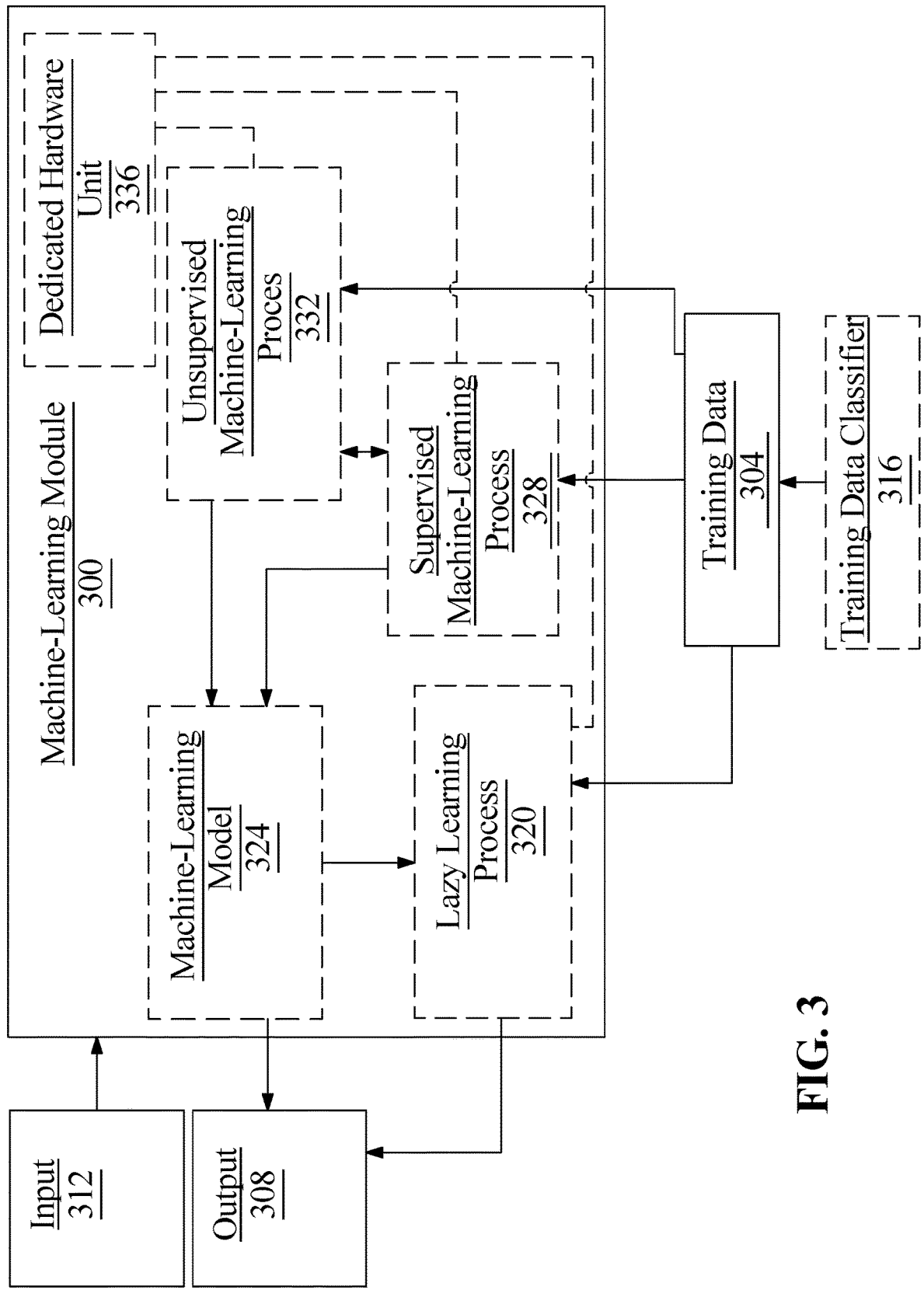
FIG. 3 is a block diagram illustrating an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example training data may include a plurality of observed runtime behaviors as input correlated to a plurality of compliances as output.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, computing device 304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_1$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitation may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include observed runtime behaviors as described above as inputs, software compliance as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
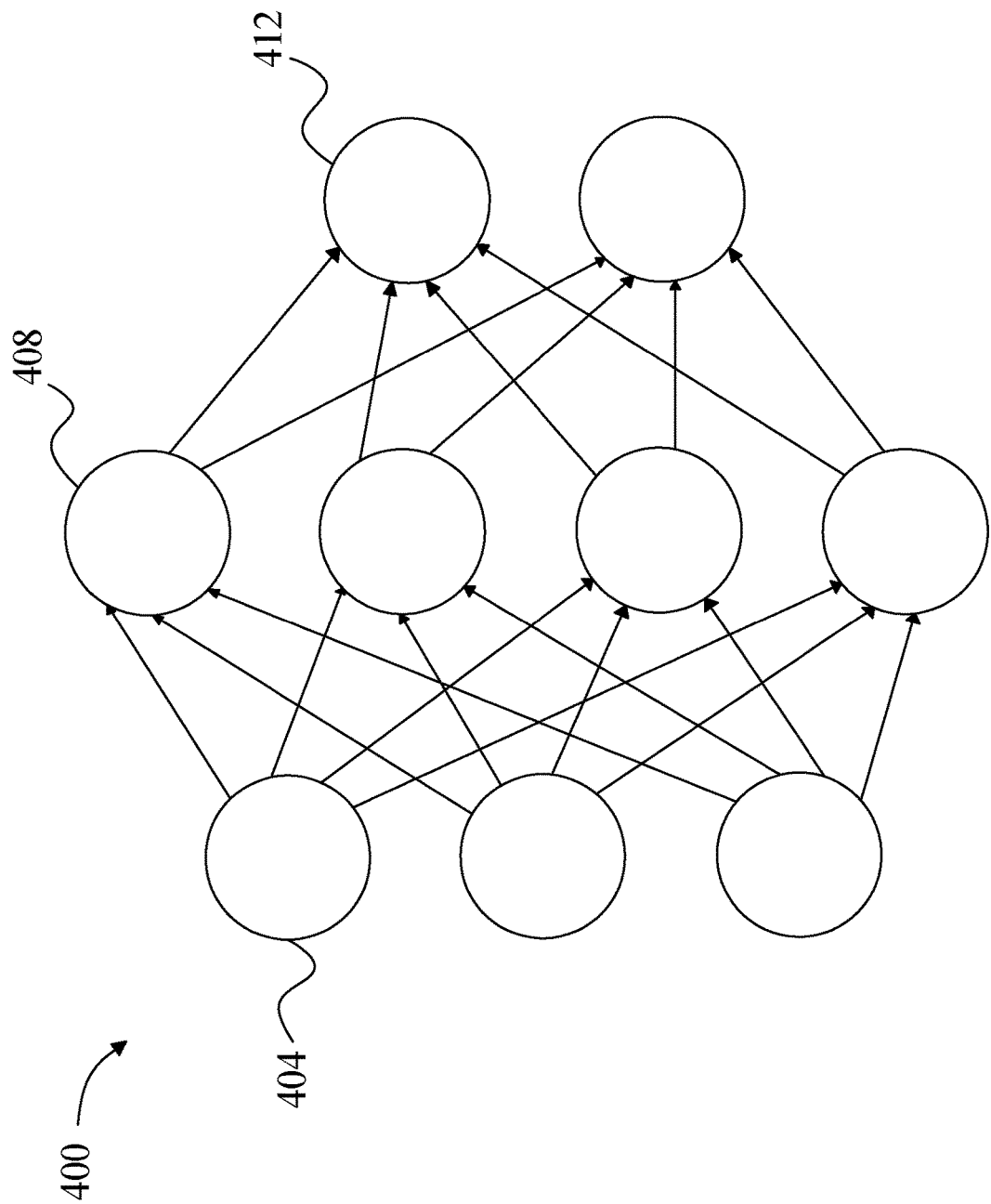
FIG. 4 is a schematic diagram illustrating an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
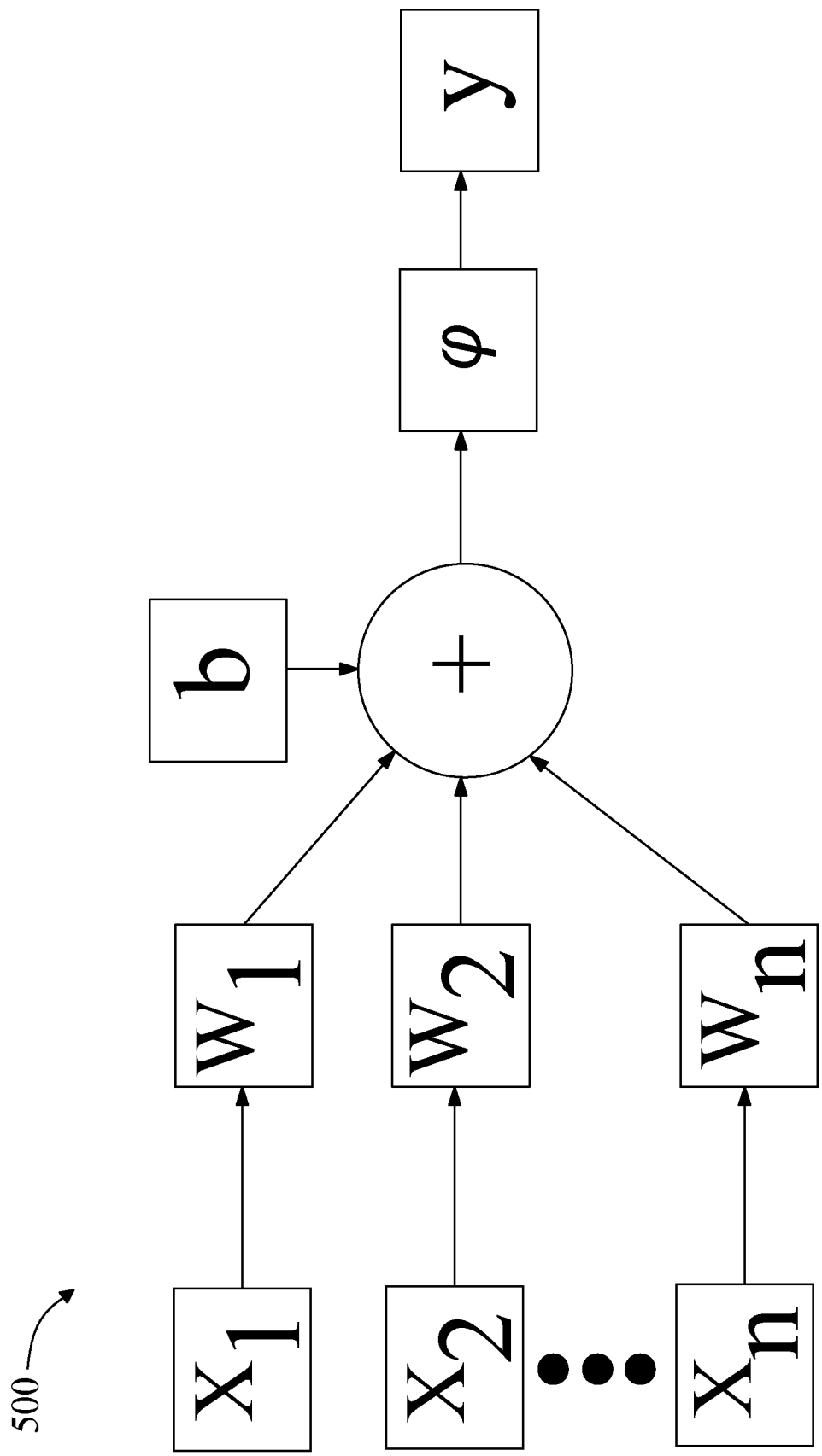
FIG. 5 is a schematic diagram illustrating an exemplary neural network node.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
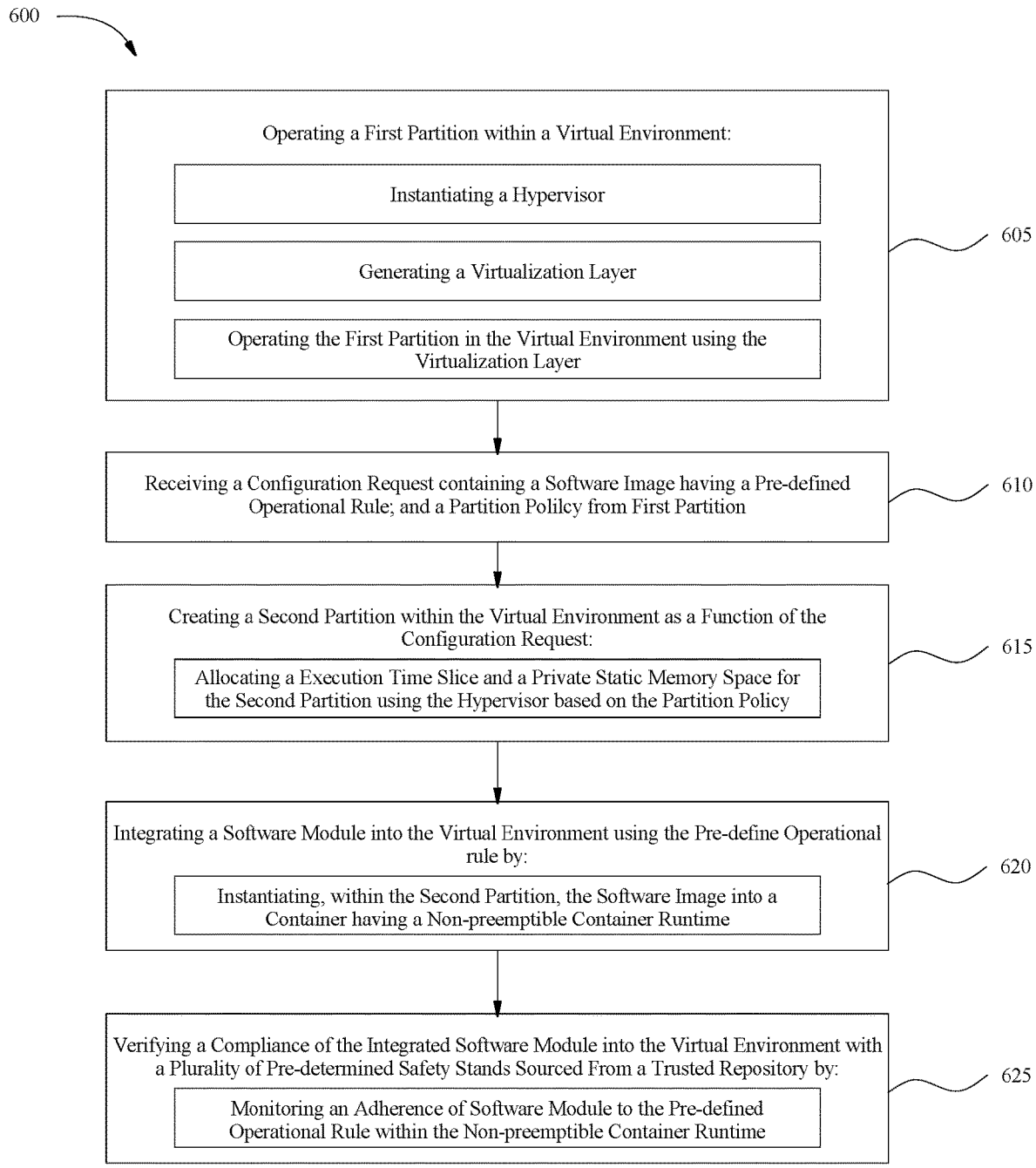
FIG. 6 is a flow diagram illustrating an apparatus for providing an SCOE.

Now referring to FIG. 6, a flow diagram of an exemplary method 600 for providing a safety-critical operating environment (SCOE) is illustrated. The method 600 includes a step 605 of operating, by at least a processor at a host circuit having a memory communicatively connected to the at least a processor, a first partition within a virtual environment, wherein operating the first partition further includes instantiating a hypervisor, generating a virtualization layer supervised by the hypervisor, and operating the first partition in the virtual environment using the virtualization layer. In some embodiments, the hypervisor may include a type-1 hypervisor that operates directly on the host circuit. This may be implemented, without limitation, as described above with reference to FIGS. 1-5.

With continued reference to FIG. 6, method 600 includes a step 610 of receiving, by the at least a processor, a configuration request from the first partition, wherein the configuration request includes a software image including a pre-defined operational rule and at least one partition policy. This may be implemented, without limitation, as described above with reference to FIGS. 1-5.

With continued reference to FIG. 6, method 600 includes a step 615 of creating, by the at least a processor, a second partition within the virtual environment as a function of the configuration request, wherein creating the second partition includes allocating a dedicated execution time slice and a private static memory space for the second portion using the hypervisor based on the at least one partition policy. In some embodiments, the at least a processor may include a multi-core processor having a plurality of cores, wherein the memory contains instructions configuring the multi-core processor to distribute the operation of the first partition to a first core of the plurality of cores and operate the second partition using a second core of the plurality of cores. In some embodiments, the virtual environment may include a plurality of third partitions within the virtual environment, wherein each third partition of the plurality of third partition may include at least a platform service segment. In some embodiments, the virtualization layer may include a virtual bus, wherein the virtual bus is configured to connect the first partition with the second partition and connect the first partition with the plurality of third partitions, thereby isolating the second partition from direct communication with the plurality of third partitions. This may be implemented, without limitation, as described above with reference to FIGS. 1-5.

With continued reference to FIG. 6, method 600 includes a step 620 of integrating, by the at least a processor, a software module into the virtual environment using the pre-defined operational rule by instantiating, within the second partition, the software image into at least one container, wherein the at least one container includes a non-preemptable container runtime. In some embodiments, instantiating the software image into the at least one container may include extracting software metadata from the software image, wherein the software metadata may include a plurality of software configuration parameters and a plurality of digital files, initializing the at least one container within the second partition as a function of the plurality of software configuration parameters, and deploying the plurality of digital files within the initialized at least one container by loading the at least one operational rule into the non-preemptable container runtime. In some embodiments, the first partition may include a logging mechanism configured to record non-preemptable container runtime behaviors. This may be implemented, without limitation, as described above with reference to FIGS. 1-5.

With continued reference to FIG. 6, method 600 includes a step 625 of verifying, by the at least a processor, a compliance of the integrated software module with a plurality of pre-determined safety standards sourced from a trusted repository by monitoring an adherence of the software module to the pre-defined operational rule within non-preemptable container runtime at the first partition. In some embodiments, verifying the compliance of the integrated software module may include training a machine learning model using runtime behavior training data, wherein the runtime behavior training data comprises a plurality of non-preemptable container runtime behaviors as input correlated to a plurality of compliance metrics as output, and generating a compliance matrix as a function of the non-preemptable container runtime behavior using the trained machine learning module. This may be implemented, without limitation, as described above with reference to FIGS. 1-5.

With continued reference to FIG. 6, method 600 may further include a step of adjusting, by the at least a processor, connections between the partitions within the virtual environment as a function of the compliance matrix. Method 600 may further include a step of invalidating, by the at least a processor, one or more cache entries within the memory corresponding to the second partition upon a conclusion of the dedicated execution time slice, thereby preventing unauthorized access from the second partition outside the process. This may be implemented, without limitation, as described above with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
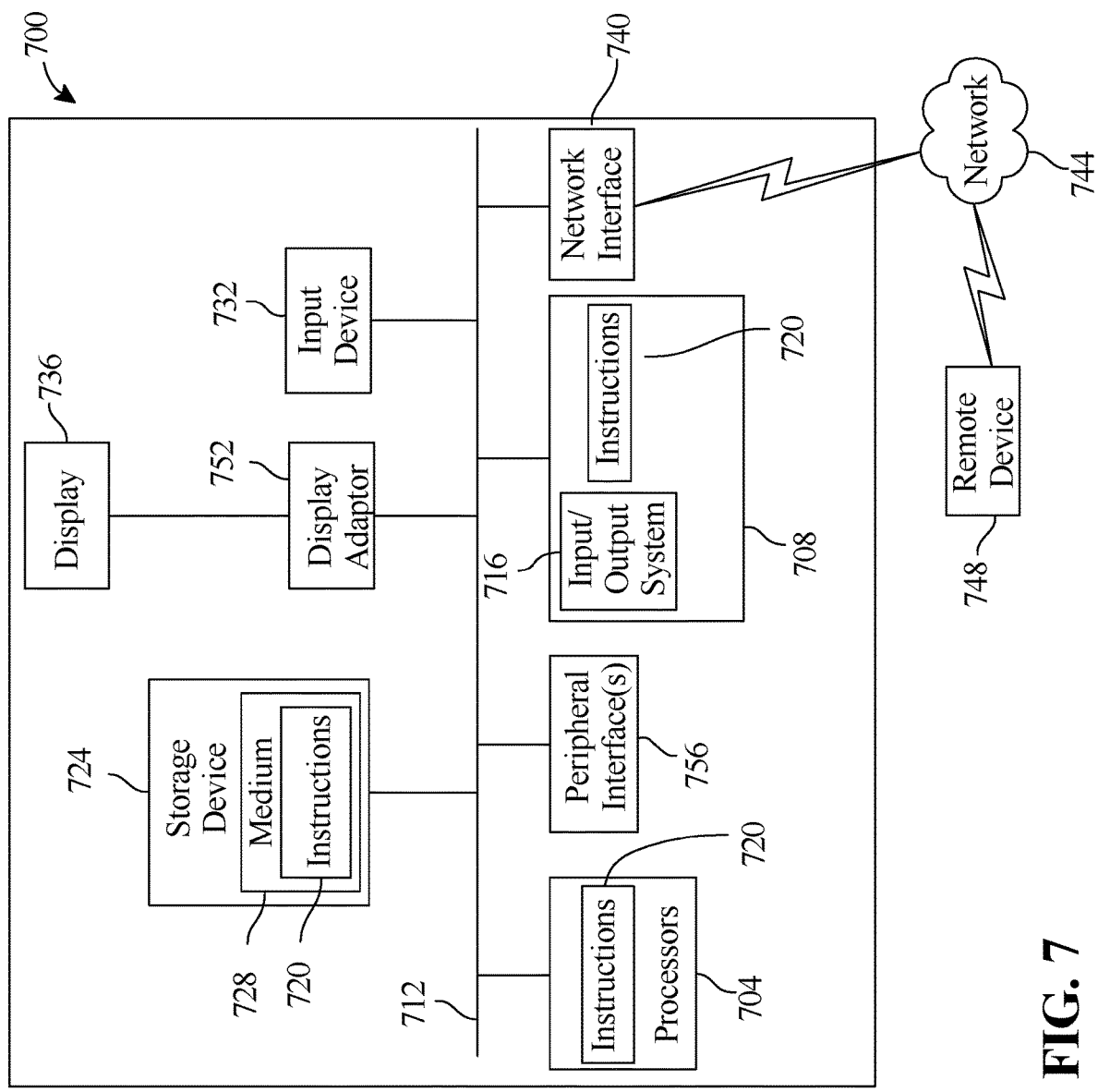
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for providing a safety-critical operating environment, wherein the apparatus comprises:
   a host circuit having at least a processor and a memory communicatively connected to the at least a processor, wherein the memory contains instructions configuring the at least a processor to:
      operate a first partition within a virtual environment, wherein operating the first partition further comprises:
         instantiating a hypervisor;
         generating a virtualization layer supervised by the hypervisor; and
         operating the first partition in the virtual environment using the virtualization layer;
      receive a configuration request from the first partition, wherein the configuration request comprises a software image including a pre-defined operational rule and at least one partition policy and a Flight Management System (FMS) module;
      create a second partition within the virtual environment as a function of the configuration request, wherein creating the second partition comprises:
         allocating a dedicated execution time slice and a private static memory space for the second partition using the hypervisor based on the at least one partition policy;
      integrate a software module into the virtual environment using the pre-defined operational rule by instantiating, within the second partition, the software image into at least one container, wherein the at least one container comprises a non-preemptable container runtime and wherein the FMS module is instantiated within the at least one container and runs with a non-preemptable runtime to ensure data processing is not interrupted to maintain safety of flight operations; and
      verify a compliance of the integrated software module with a plurality of pre-determined safety standards sourced from a trusted repository by monitoring an adherence of the software module to the pre-defined operational rule within the non-preemptable container runtime at the first partition.

2. The apparatus of claim 1, wherein the hypervisor comprises a type-1 hypervisor that operates directly on the host circuit.

3. The apparatus of claim 1, wherein the at least a processor comprises:
   a multi-core processor having a plurality of cores, wherein the memory contains instructions configuring the multi-core processor to:
      distribute the operation of the first partition to a first core of the plurality of cores; and
      operate the second partition using a second core of the plurality of cores.

4. The apparatus of claim 1, wherein the virtual environment comprises:
   a plurality of third partitions within the virtual environment, wherein each third partition of the plurality of third partition comprises at least a platform service segment.

5. The apparatus of claim 4, wherein the virtualization layer comprises:
   a virtual bus, wherein the virtual bus is configured to:
      connect the first partition with the second partition; and
      connect the first partition with the plurality of third partitions, thereby isolating the second partition from direct communication with the plurality of third partitions.

6. The apparatus of claim 1, wherein instantiating the software image into the at least one container comprises:
   extracting software metadata from the software image, wherein the software metadata comprises a plurality of software configuration parameters and a plurality of digital files;
   initializing the at least one container within the second partition as a function of the plurality of software configuration parameters; and
   deploying the plurality of digital files within the initialized at least one container by loading the at least one operational rule into the non-preemptable container runtime.

7. The apparatus of claim 1, wherein the first partition comprises a logging mechanism configured to record non-preemptable container runtime behaviors.

8. The apparatus of claim 7, wherein verifying the compliance of the integrated software module comprises:
   training a machine learning model using runtime behavior training data, wherein the runtime behavior training data comprises a plurality of non-preemptable container runtime behaviors as input correlated to a plurality of compliance metrics as output; and generating a compliance matrix as a function of the non-preemptable container runtime behavior using the trained machine learning module.

9. The apparatus of claim 8, wherein the memory further contains instructions configuring the at least a processor to:
adjust connections between the partitions within the virtual environment as a function of the compliance matrix.

10. The apparatus of claim 1, wherein the memory further contains instructions configuring the at least a processor to:
invalidate one or more cache entries within the memory corresponding to the second partition upon a conclusion of the dedicated execution time slice, thereby preventing unauthorized access from the second partition outside the process.

11. A method for providing a safety-critical operating environment, wherein the method comprises:
operating, by at least a processor at a host circuit having a memory communicatively connected to the at least a processor, a first partition within a virtual environment, wherein operating the first partition further comprises:
instantiating a hypervisor;
generating a virtualization layer supervised by the hypervisor; and
operating the first partition in the virtual environment using the virtualization layer;
receiving, by the at least a processor, a configuration request from the first partition, wherein the configuration request comprises a software image including a pre-defined operational rule and at least one partition policy and a Flight Management System (FMS) module;
creating, by the at least a processor, a second partition within the virtual environment as a function of the configuration request, wherein creating the second partition comprises:
allocating a dedicated execution time slice and a private static memory space for the second partition using the hypervisor based on the at least one partition policy;
integrating, by the at least a processor, a software module into the virtual environment using the pre-defined operational rule by instantiating, within the second partition, the software image into at least one container, wherein the at least one container comprises a non-preemptable container runtime and wherein the FMS module is instantiated within the at least one container and runs with a non-preemptable runtime to ensure data processing is not interrupted to maintain safety of flight operations; and
verifying, by the at least a processor, a compliance of the integrated software module with a plurality of pre-determined safety standards sourced from a trusted repository by monitoring an adherence of the software module to the pre-defined operational rule within non-preemptable container runtime at the first partition.

12. The method of claim 11, wherein the hypervisor comprises a type-1 hypervisor that operates directly on the host circuit.

13. The method of claim 11, wherein the at least a processor comprises:

a multi-core processor having a plurality of cores, wherein the memory contains instructions configuring the multi-core processor to:
distribute the operation of the first partition to a first core of the plurality of cores; and
operate the second partition using a second core of the plurality of cores.

14. The method of claim 11, wherein the virtual environment comprises:
a plurality of third partitions within the virtual environment, wherein each third partition of the plurality of third partition comprises at least a platform service segment.

15. The method of claim 14, wherein the virtualization layer comprises:
a virtual bus, wherein the virtual bus is configured to:
connect the first partition with the second partition; and
connect the first partition with the plurality of third partitions, thereby isolating the second partition from direct communication with the plurality of third partitions.

16. The method of claim 11, wherein instantiating the software image into the at least one container comprises:
extracting software metadata from the software image, wherein the software metadata comprises a plurality of software configuration parameters and a plurality of digital files;
initializing the at least one container within the second partition as a function of the plurality of software configuration parameters; and
deploying the plurality of digital files within the initialized at least one container by loading the at least one operational rule into the non-preemptable container runtime.

17. The method of claim 11, wherein the first partition comprises a logging mechanism configured to record non-preemptable container runtime behaviors.

18. The method of claim 17, wherein verifying the compliance of the integrated software module comprises:
training a machine learning model using runtime behavior training data, wherein the runtime behavior training data comprises a plurality of non-preemptable container runtime behaviors as input correlated to a plurality of compliance metrics as output; and
generating a compliance matrix as a function of the non-preemptable container runtime behavior using the trained machine learning module.

19. The method of claim 18, further comprises:
adjusting, by the at least a processor, connections between the partitions within the virtual environment as a function of the compliance matrix.

20. The method of claim 11, further comprises:
invalidating, by the at least a processor, one or more cache entries within the memory corresponding to the second partition upon a conclusion of the dedicated execution time slice, thereby preventing unauthorized access from the second partition outside the process.

* * * * *